United States Patent [19]
Serlet et al.

[11] Patent Number: 5,481,721
[45] Date of Patent: Jan. 2, 1996

[54] METHOD FOR PROVIDING AUTOMATIC AND DYNAMIC TRANSLATION OF OBJECT ORIENTED PROGRAMMING LANGUAGE-BASED MESSAGE PASSING INTO OPERATION SYSTEM MESSAGE PASSING USING PROXY OBJECTS

[75] Inventors: Bertrand Serlet; Lee Boynton, both of Palo Alto; Avadis Tevanian, Mountain View, all of Calif.

[73] Assignee: NeXT Computer, Inc., Redwood City, Calif.

[21] Appl. No.: 332,486

[22] Filed: Oct. 31, 1994

Related U.S. Application Data

[63] Continuation of Ser. No. 731,636, Jul. 17, 1991, abandoned.
[51] Int. Cl.[6] ................................................ G06F 9/44
[52] U.S. Cl. .............................. 395/700; 364/DIG. 1; 364/280; 364/284.3; 364/284
[58] Field of Search .............................. 395/700, 650; 364/DIG. 1, DIG. 2

[56] References Cited

U.S. PATENT DOCUMENTS

| | | | |
|---|---|---|---|
| 5,060,150 | 10/1991 | Simor | 364/200 |
| 5,230,051 | 7/1993 | Quan | 395/700 |
| 5,305,461 | 4/1994 | Feigenbaum et al. | 395/775 |

OTHER PUBLICATIONS

Bennet, J. K., "The design and implementation of Distributed Smalltalk", SIGPLAN Notices, vol. 22, No. 12, pp. 318–320, OOPSLA '87 Proceedings, Dec. 1987.

McCullough, P. L., "Transparent Forwarding: First Steps", SIGPLAN Notices, vol. 22, No. 12, pp. 331–341, OOPSLA '87 Proceedings, Dec. 1987.

Shapiro, M., "The Design of a Distributed Object–Oriented Operating System For Office Applications", ESPRIT '88. Putting the Technology to Use Proceedings of the 5th Annual ESPRIT Conference, pp. 1020–1027, vol. 2, Nov. 1988.

*Primary Examiner*—Kevin A. Kriess
*Attorney, Agent, or Firm*—Hecker & Harriman

[57] ABSTRACT

The present invention provides a method and apparatus for the distribution of objects and the sending of messages between objects that are located in different processes. Initially, a "proxy" object is created in the same process as a sender object. This proxy acts as a local receiver for all objects in the local program. When the proxy receives a message, the message is encoded and transmitted between programs as a stream of bytes. In the remote process, the message is decoded and executed as if the sender was remote. The result follows the same path, encoded, transmitted, and then decoded back in the local process. The result is then provided to the sending object.

24 Claims, 6 Drawing Sheets

METHOD FOR PROVIDING AUTOMATIC AND DYNAMIC TRANSLATION OF OBJECT ORIENTED PROGRAMMING LANGUAGE-BASED MESSAGE PASSING INTO OPERATION SYSTEM MESSAGE PASSING USING PROXY OBJECTS

BACKGROUND OF THE PRESENT INVENTION

This is a continuation of application Ser. No. 07/731,636 filed Jul. 17, 1991, now abandoned.

FIELD OF THE INVENTION

This invention relates to the field of object-oriented programming and distributed computing.

BACKGROUND ART

Object-oriented programming is a method of creating computer programs by combining certain fundamental building blocks, and creating relationships among and between the building blocks. The building blocks object-oriented programming systems are called "objects." An object is a programming unit that groups together a data structure (instance variables) and the operations (methods) that can use or affect that data. Thus, an object consists of data and one or more operations or procedures that can be performed on that data. The joining of data and operations into a unitary building block is "encapsulation." In object-oriented programming, operations that can be performed on the data are referred to as "methods."

An object can be instructed to perform one of its methods when it receives a "message." A message is a command or instruction to the object to execute a certain method. It consists of a method selection (name) and arguments that are sent to an object. A message tells the receiving object what to do.

One advantage of object-oriented programming is the way in which methods are invoked. When a message is sent to an object, it is not necessary for the message to instruct the object how to perform a certain method. It is only necessary to request that the object execute the method. This greatly simplifies program development.

Object-oriented programming languages are generally based on one of two schemes for representing general concepts and sharing knowledge. One scheme is known as the "class" scheme. The other scheme is known as the "prototype" scheme. Both the set-based and prototype-based object-oriented programming schemes are generally described in Lieberman, "Using Prototypical Objects to Implement Shared Behavior in Object-Oriented Systems," OOPSLA 86 Proceedings, September 1986, pp. 214–223.

Class Scheme

An object that describes behavior is called a "class." Objects that acquire a behavior and that have states are called "instances." Thus, in the objective C language, which is the computer language in which the preferred embodiment of the present invention is implemented, a class is a particular type of object. In objective C, any object that is not a class object is said to be an instance of its class. The classes form a "hierarchy." Each subclass in the hierarchy may add to or modify the behavior of the object in question and may also add additional states. Inheritance is a fundamental property of the class scheme and allows objects to acquire behavior from other objects.

The inheritance hierarchy is the hierarchy of classes defined by the arrangement of superclasses and subclasses. Except for the root classes, every class has a superclass, and any class may have an unlimited number of subclasses. Each class inherits from those classes above it in the hierarchy. Thus, a superclass has the ability to pass its characteristics (methods and instance variables) onto its subclasses.

FIG. 1 is a block diagram that illustrates inheritance. Class 1 (generally indicated by block 101) defines a class of objects that have three methods in common, namely, A, B and C. An object belonging to a class is referred to as an "instance" of that class. An example of an instance of class 1 is block 102. An instance such as instance 102 contains all the methods of its parent class. Block 102 contains methods A, B and C.

As discussed, each class may also have subclasses, which also share all the methods of the class. Subclass 1.1 (indicated by block 103) inherits methods A, B and C and defines an additional method, E. Each subclass can have its own instances, such as, for example, instance 104. Each instance of a subclass includes all the methods of the subclass. For example, instance 104 includes methods A, B, C and E of subclass 1.1.

Not all object oriented programming languages permit new methods to be added per instance. For, example, in Objective C, an instance can not have methods that are not contained in its parent class.

A disadvantage of an inheritance-based, object-oriented programming language is object size. Because each subclass must, by definition, include all methods of its parent class and super classes, instances are larger at the bottom of the inheritance hierarchy.

Object-oriented programming languages that utilize the class/instance/inheritance structure described above implement a set-theoretic approach to sharing knowledge. This approach is used in object-oriented programming languages, such as Simula, SmallTalk, Flavors and Loops.

Prototype Scheme

The prototype scheme is an alternate approach to sharing knowledge in an object-oriented system. In prototype scheme systems that use the individual instances, rather than a class, ("prototypes") are created first, instead of a class. The prototypes are then generalized by defining aspects of their concepts that are permitted to vary. The mechanism for implementing this process is known as "delegation." Examples of prototype languages include the actor language and lisp-based object-oriented systems, such as director, t, and orbit.

Delegation removes the distinction between classes and instances. To create another object that shares knowledge with a prototype, an "extension" object is created that has a list containing its prototypes that may be shared with other objects and containing personal behavior limited to the object itself. When an extension object receives a message, it attempts to respond to the message using the behavior stored in its personal aspect. If the object's personal characteristics are not suitable to answer the message, the object forwards the message on to other prototypes to see if one can respond to the message. This method of forwarding is called "delegating the message."

An example of delegation is illustrated in FIG. 2. Object A provides a message 201 to object B. The message includes a method and arguments to the method. Object B does not have the method required by the message. Therefore, object B cannot respond to the message. Instead, object B sends the method and message to its delegate. The delegate of object B is object C. Object C has the method requested in the message. The method can then be executed and a response provided to object A.

Distributed Programming

A disadvantage of current object-oriented programming systems is that all objects are required to exist in a single program or process. This prohibits utilizing an object-oriented programming system when writing distributed applications. In addition, these prior art limitations prevent the creation of applications that are distributed physically over networks of machines.

The difficulty of creating distributed object-oriented programs is illustrated in FIGS. 8A and 8B. In FIG. 8A, all objects are resident in the same program, namely program LOCAL 801. A sender object 802 sends a message 804 to a receiver 803. The message may include a method and an argument. The receiver 803 executes the method of the message 804 and returns a result 805. The result 805 is provided back to the sender 802. In the example of FIG. 8A, the object-oriented program resides entirely on one side of a boundary 806.

FIG. 8B illustrates a prior art object-oriented programming system attempting to communicate across a boundary between processes. A local process 801 includes a sender object 802 that generates a message 804 destined for receiver object 808. However, object 808 is on the opposite side of boundary 806. That is a separate process identified as REMOTE 807. An object, such as receiver 808 which resides in a different process than a sender object, is known a "remote object." The language and run time support of the local process 801 does not provide a mechanism to send a message 804 directly to the remote object 808. At the transition point 809 of boundary 806, the message is stopped.

One prior art approach for writing distributed applications consists of explicitly defining the boundaries between different programs by specifying protocols, generating client/server stubs, and communicating between processes or programs by using function calls that automatically transport arguments and return values between the client layer and the server layer. At such boundaries, the object-oriented developer can no longer treat items as objects as soon as the boundary of the process is crossed. This defeats the purpose and advantage of using object-oriented programming in the first place.

Another prior art method for providing distributed object oriented programming is described in "Design of a Distributed Object Manager for the SmallTalk-80System," D. Decouchant, OOPSLA 86 Proceedings, September, 1986, pp. 444–452. The Decouchant reference describes the design of a distributed object manager that allows several Small-Talk-80 systems to share objects over a local area network. When a local object desires to communicate with a remote object, the local object communicates with a "proxy" that locally represents the remote object. A proxy is part of the private data of the object manager. The proxy has two fields that describe a remote object, namely, the resident site of the remote object and a virtual pointer to the object in the resident site. If the referenced object migrates, the contents of the referencing object are not modified. The proxy is updated accordingly by the object manager. In this implementation, a proxy is functionally equivalent to a Unix link, except that a proxy is not visible to the programmer. It is a private data structure which is handled by the object manager like other Small-Talk objects.

In the Decouchant reference, three processes cooperate to perform the object manager functions. These are the network manager, the main memory manager and the secondary manager. SmallTalk interpreter processes which access the objects to perform SmallTalk actions may also be present on the site. The network manager is the master process of a SmallTalk site. It ensures consistency of the shared objects with the other network sites and controls the local processes. The main memory manager is in charge of the object management in main memory. It resolves object faults by allocating free space for the missing object and sending an object load request to the secondary storage manager. The secondary memory manager takes care of the object management in secondary storage. This storage is represented by two files, one of which contains the SmallTalk object table and the other one contains the object space.

Another prior art method to provide distributed object-oriented programming is described in "The Design and Implementation of Distributed SmallTalk," John K. Bennett, OOPSLA, Oct. 4–8, 1987, pp. 318–330. SmallTalk itself is a language environment that provides a single user with access to a single object address space. Only rudimentary support exists within SmallTalk for cooperation among users, and no support exists within SmallTalk for object sharing between users or between different machines or between processes on the same or different machines. The Bennett references describes "distributed SmallTalk" (DS) as a method of providing improved communication and interaction among geographically remote SmallTalk users, direct access to remote objects, the ability to construct distributed applications in a SmallTalk environment, and a degree of object sharing among users.

The system described in the Bennett reference does not allow remote classes. Instead, the system requires that classes and instances be co-resident on all processes and machines. This impacts object mobility adversely. Instances can only move to hosts with compatible classes and insuring class compatibility is difficult. In addition, the system of Bennett does not operate in an object-oriented programming system that utilizes class inheritance and reactiveness. (Reactiveness describes the ability of a system to present objects for inspection or modification).

The system of Bennett uses ProxyObjects and a RemoteObjectTable to implement distributed message passing. A ProxyObject represents a remote object to all objects in a local address space. There is one ProxyObject per host per remote object referenced by that host. ProxyObjects cause a remote object's message interface to appear to local objects as if the remote object were locally resident. ProxyObjects redefine the doesNotUnderstand: message of object. This is the primary message defined for ProxyObjects. In other words, messages sent to ProxyObjects are intended to fail. The system responds to this failure by sending the message doesNotUnderstand: to the receiver with the message that was not understood as an argument. The ProxyObject's response to the doesNotUnderstand: message is to forward the original message to the RemoteObjectTable on the appropriate machine or process. The location of the remote object is part of the internal state of the ProxyObject.

The RemoteObjectTable is responsible for receiving and replying to messages forwarded by ProxyObjects. There is one RemoteObjectTable per host. It is the sole instance of class RemoteObjectTable. The RemoteObjectTable can be thought of as a set of extensions to the object tables (if present) of all remote machines. The RemoteObjectTable keeps track of all local objects that are remotely referenced. When the RemoteObjectTable receives a message from some ProxyObject, it schedules a process that will contain the execution context of the actual message receiver by sending the message perform to the receiver with the forwarded selector and arguments (if any) as arguments to the perform message. The value returned by the perform message is returned to the remote sender in a reply message constructed by the RemoteObjectTable.

Before an object can be sent between processes, the classes must be checked for compatibility. The three cases to consider are:

1. The required class is already present and is compatible;
2. The required class is present, but it is determined to be incompatible; and
3. The required class is not present.

In case 1, the system proceeds normally. In the second case, the attempted move fails and the user is notified of the error. In case 3, the user is asked whether the desired object's class should be moved. If the response is affirmative, the object's super class is checked for compatibility. This procedure continues up the class hierarchy until class object is reached. However, class object may not be moved.

Another method for providing distributed object-oriented programming is described in "Transparent Forwarding: First Steps" Paul L. McCullough, OOPSLA 1987 Proceedings, Oct. 4–8, 1987, pp. 331–341. As in the Bennett system, the McCullough system utilizes ProxyObjects and the doesNotUnderstand: message for identifying and transmitting messages. In the McCullough system, the implementation of doesNotUnderstand: creates an ethernet packet containing the original message and forwards it to the machine containing the remote object. The proxy contains information in its instance variables about where the remote object resides.

FIG. 6 illustrates an overview of the operation of the McCullough system. A message 601 destined for a remote object is provided to a ProxyObject 602. The ProxyObject instance forms a representation of the message, including both the selector and the arguments, suitable for transmission to a remote machine. This message 603 is forwarded across the process boundary 606 to a remote object 604. The remote object 604 receives the representation of the message, extracts the message selector and arguments and executes the message send as though it originated on the same machine as the remote object. This result object 605 is transmitted across the process boundary 606 to the ProxyObject 602. The ProxyObject 602 uses the return representation to reconstruct the result object and returns it to the sender of the original message 601.

The McCullough system implements four possible message parameter passing schemes, namely, pass by value, pass by reference, pass by proxy and pass by migration. In pass by value, a representation of the object is shipped to the remote machine, which in turn reconstructs the object. Pass by reference cannot be used in a SmallTalk environment because the compiler prevents assignment to formal parameter variables. In pass by proxy, a proxy for the object and any messages which are sent to the proxy are automatically forwarded to the remote object. In pass by migration, we move an object from one machine to another, leaving a proxy object in its prior home.

A centralized control scheme, referred to as PolicyMaker, is used to deliver messages to remote objects. Individual proxies need not record the current network location of a shared object, that is the responsibility of the PolicyMaker. PolicyMaker responsibilities include the decision of whether to pass objects by value, proxy or by migration, and whether to forward a message to a remote object or whether to migrate the object to the local machine for execution. In addition, PolicyMaker keeps track of open connections between machines. For each connection to a remote machine, the PolicyMaker creates an instance of class TransporterRoom. The TransporterRoom takes care of communications protocols between machines, as well as the linearization of messages and objects.

FIG. 7 illustrates the flow control of sending a message from a machine to a remote object using the scheme of the McCullough system. A message 701, destined for a remote object, is provided to a ProxyObject 702. The sender of the message 701 believes it is sending to a local object, but in reality it is sending to a remote object. The ProxyObject 702 sends a message 703 to the local PolicyMaker 704. The PolicyMaker 704 determines whether the arguments of the message should be sent by copying or by proxy to the remote object. The PolicyMaker establishes a connection to the remote machine via transporter room 706. The PolicyMaker 704 provides the message 705 to the TransporterRoom 706. The TransporterRoom 706 linearizes and transmits the message as message 707 to the remote machine across process boundary 708.

The TransporterRoom 709 of the remote machine receives the message 707. The TransporterRoom 709 sends the reconstructed message 710 to the remote object 711. The remote object 711 returns a message 714 to the TransporterRoom 709. The PolicyMaker 712 considers the resulting object and determines whether to return it by value or by proxy and communicates to the TransporterRoom 709 on path 713. The TransporterRoom 709 sends the message 707 to the TransporterRoom 706 across process boundary 708. The TransporterRoom 706 reconstructs the result object and provides it as message 715 to proxy object 702, which can then return it to the sending context.

The use of migration limits the performance and ease of use of these prior art schemes. Migration of objects from their home process adds to the complexity of the system. Another disadvantage of these prior art schemes is that each process and thread must be forked to anticipate each expected iteration. There is no provision for dynamic recursive communication between processes. In addition, these prior art schemes rely on a pure, large object oriented language/environment, such as SmallTalk. This requires substantial run time support to implement communication between processes. In addition, the prior art schemes do not implement suitable object collection methods.

SUMMARY OF THE INVENTION

The present invention permits the distribution of objects and sending of messages between objects that are located in different processes. Initially, a "proxy" object is created in the same process as a sender object. This proxy acts as a local receiver for all objects in the local program. When the proxy receives a message, the message is encoded and transmitted between programs as a stream of bytes. In the remote process, the message is decoded and executed as if the sender was remote. The result follows the same path, encoded, transmitted, and then decoded back in the local process. The result is then provided to the sending object.

DETAILED DESCRIPTION OF THE INVENTION

A method and apparatus for distributed execution of methods is described. In the following description, numerous specific details, such as object-oriented programming language, operating system, etc., are set forth in detail in order to provide a more thorough understanding of the present invention. It will be apparent, however, to one skilled in the art, that the present invention may be practiced without these specific details. In other instances, well known features have not been described in detail so as not to obscure the present invention.

Figure 1:
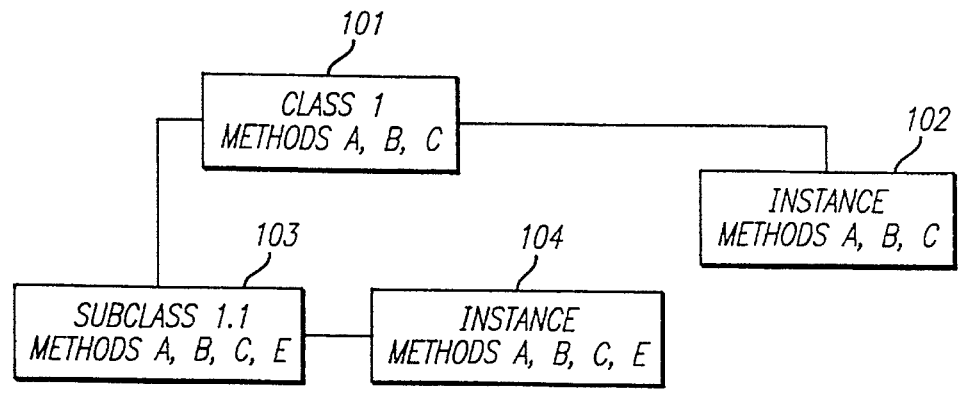
FIG. 1 is a block diagram illustrating the concept of inheritance in object-oriented programming.
Figure 2:
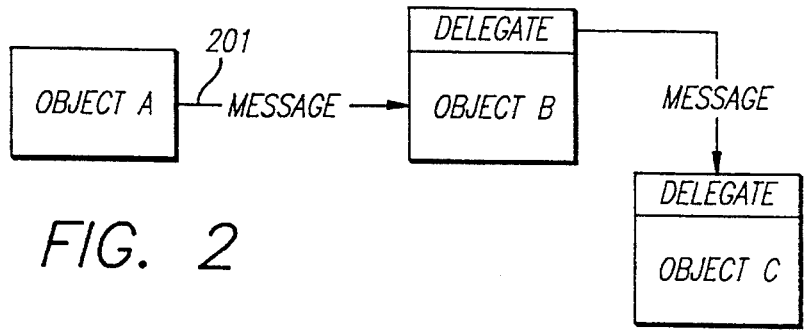
FIG. 2 is a block diagram illustrating delegation in object-oriented programming.
Figure 4:
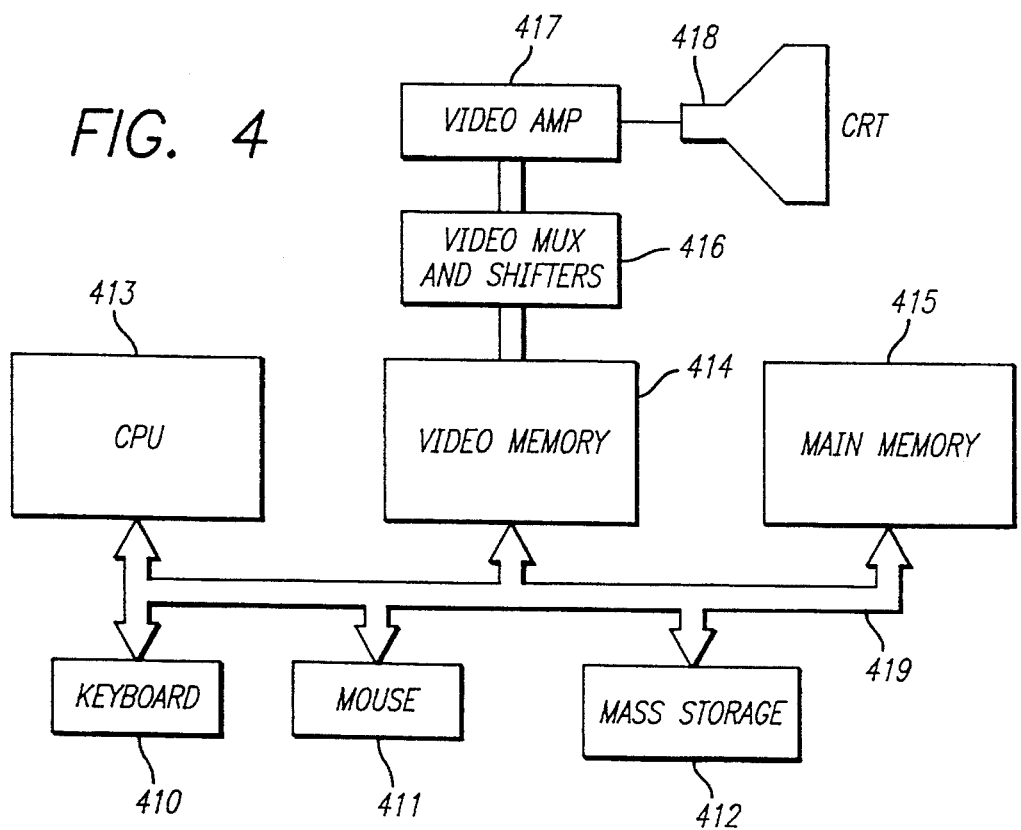
FIG. 4 is a block diagram illustrating a general purpose computer system for implementing the present invention.

The present invention may be implemented on any conventional or general purpose computer system. An example of one embodiment of a computer system for implementing this invention is illustrated in FIG. 4. A keyboard 410 and mouse 411 are coupled to a bi-directional system 419. The keyboard and mouse are for introducing user input to the computer system and communicating that user input to CPU 413. The computer system of FIG. 4 also includes a video memory 414, main memory 415 and mass storage 412, all coupled to bi-directional system bus 419 along with keyboard 410, mouse 411 and CPU 413. The mass storage 412 may include both fixed and removable media, such as magnetic, optical or magnetic optical storage systems or any other available mass storage technology. The mass storage may be shared on a network, or it may be dedicated mass storage. Bus 419 may contain, for example, 32 address lines for addressing video memory 414 or main memory 415. The system bus 419 also includes, for example, a 32-bit data bus for transferring data between and among the components, such as CPU 413, main memory 415, video memory 414 and mass storage 412. Alternatively, multiplex data/address lines may be used instead of separate data and address lines.

In the preferred embodiment of this invention, the CPU 413 is a 32-bit microprocessor manufactured by Motorola, such as the 68030 or 68040. However, any other suitable microprocessor or microcomputer may be utilized. The Motorola microprocessor and its instruction set, bus structure and control lines are described in MC68030 User's Manual, and MC68040 User's Manual, published by Motorola Inc. of Phoenix, Ariz.

Main memory 415 is comprised of dynamic random access memory (DRAM) and in the preferred embodiment of this invention, comprises 8 megabytes of memory. More or less memory may be used without departing from the scope of this invention. Video memory 414 is a dual-ported video random access memory, and this invention consists, for example, of 256 kbytes of memory. However, more or less video memory may be provided as well.

One port of the video memory 414 is coupled to video multiplexer and shifter 416, which in turn is coupled to video amplifier 417. The video amplifier 417 is used to drive the cathode ray tube (CRT) raster monitor 418. Video multiplexing shifter circuitry 416 and video amplifier 417 are well known in the art and may be implemented by any suitable means. This circuitry converts pixel data stored in video memory 414 to a raster signal suitable for use by monitor 418. Monitor 418 is a type of monitor suitable for displaying graphic images, and in the preferred embodiment of this invention, has a resolution of approximately 1020× 832. Other resolution monitors may be utilized in this invention.

The computer system described above is for purposes of example only. The present invention may be implemented in any type of computer system or programming or processing environment.

The preferred embodiment of the present invention implements an object-oriented programming system using objective C language. Objective C is an extension to ANSI C that supports the definition of classes of objects and provides syntactic and run-time support for sending messages to objects. This language model is partially derived from SmallTalk and has been described in "Object-Oriented Programming; An Evolutionary Approach," Brad J. Cox, Addison-Wesley 1986 and in "SmallTalk-80: The Language and its Implementation," Adele Goldberg, Dave Robson, Addison-Wesley 1983.

One feature of objective C is "dynamic binding" of messages to the actual methods to be invoked, depending on the class of the receiver. A programmer writing code in objective C can create code that sends a message "doSomething" to an object. The actual method corresponding to the class of the target object does not need to be determined until the message must be sent. This allows objects of any classes that implementing the doSomething method to be substituted for the target object at run time without having to modify the part of the program that sends the message. Also, in objective C, programs have run time access to method "signatures," that encode a method's argument and return types for each class. The method signature provides a way for two programs to agree on the format of messages. Moreover, there is a way to extract arguments from the stack using the signature.

In its preferred embodiment, the present invention is implemented in a computer system using an object-oriented operating system. One such object-oriented operating system is known as the "Mach" operating system and is implemented on computers manufactured by NeXT, Inc., the Assignee of the present invention.

The Mach operating system is an object-oriented operating system that supports distributed programming. It is a multi-tasking operating system kernel, allowing multiple, independent "tasks," which provide the basic environment of a program in the form of a demand-paged virtual "address space" and one or more "threads" of execution. Mach supports message-passing within and between tasks. This support is distinct from objective C messaging described earlier.

Fundamental to Mach's ability to deliver messages between different programs is an abstraction called a "port." A Mach port is a buffered communication channel over which messages are sent. This channel, which is maintained by the operating system, may be local, may span two tasks on the same machine, or may span tasks on different machines. The physical location of the receiving end of a port has no effect on the sender, which always sees a local reference to the port.

The messages sent on a port are buffered, that is, a sender writes messages to a port with a "send" primitive, and a receiver accepts messages with a "receive" primitive. The messages themselves may be of any size, and consist of a header followed by zero or more data objects. For efficiency, large array arguments are passed out-of-line with copy-on-write semantics. Of particular interest is the ability to pass Mach ports themselves as data objects in a message. By this means, one task may pass a port to another, with the kernel maintaining address translation along the way. This allows tasks to learn about the existence of new external objects, or make new "acquaintances," by receiving their ports in a message. Thus, ports may also be viewed as a reference for an object that is independent of any particular space, and may be freely passed between programs.

For a task to communicate with a "receiver" object in another address space, it must first establish a connection with that program, and then create a local "proxy" for the object. When a message is sent to this proxy, the elements of the objective C message are encoded into a Mach message, which is then forwarded through a Mach port to the other program. On the receiving side, the message is received, decoded, and then forwarded it to the target objective C object. The return value of the objective C method is then encoded and sent back to the originator, where it is decoded and returned as the value. Each part of this model is now described.

In order to communicate with an object in a different program or process, that program or process must be known. The present invention uses Mach ports to represent "domains" of objects, and a token to identify objects within that domain. This two-part address is easily communicated, since the port maintains its identity as it moves between domains. In Mach, acquiring ports is synonymous with acquiring privileges to communicate. The present invention requires that the local domain has send rights to a port that the remote domain has receive rights to, and also that the remote domain has send rights to a port that the local domain has receive rights to, before any communication can take place. Thus, mutual consent is required to communicate.

In addition to learning of each other's ports, each domain must also provide the other with the token corresponding to its "first proxy." A first proxy is required to bootstrap the communication. There must be at least one known object in a remote domain before a message can be sent to it. Because a connection allows messages in either direction and initiated by either party, each side of a connection must have a first proxy. This first proxy may be viewed as the "receptionist" for the remote domain, as other objects are obtained (discovered) by asking this object. This object also is a candidate for implementing sender authentication.

The present invention provides a means for implementing an extensible, distributed program in which one task is responsible for creating other tasks to communicate with. This is a master/slave relationship; the master can provide the slave with send rights to the master's port as part of the creation process. When the slave starts executing, it sends a Mach message containing send rights to its port and a token for its first proxy back to the master. The master then replies with an indication of whether the connection is granted, and what token to use for the first proxy. This "bootstrap-meta-protocol" results in both tasks knowing about each other, allowing communication to ensue.

Distributed Object Oriented Programming

The present invention provides a method for different processes to communicate, using a traditional language-based, message-passing paradigm. The present invention has a number of advantages over prior art methods of distributed object-oriented programming. These advantages include no pre-defined set of messages, transparent to the programmer, no code generation step and a method for bridging the gap between object-oriented languages and object-oriented operating systems.

The present invention differs from the prior art approaches of Decouchant, Bennett and McCullough. The present invention uses an object-oriented superset of ANSI C with minimal run time support to implement transparent messaging between application programs as opposed to the prior art systems, that rely on a pure, large, dynamic object-oriented language/environment, such as SmallTalk. The present invention either implements a client/server setup or a master/slave setup that involves forking tasks to perform background operations and using the present invention to communicate with these tasks. Because communications are serialized by the operating system, remote messages performed by a slave task appear to the program just like other asynchronous events, such as mouse clicks, allowing the design of a consistent user interface. Modularity, extensibility and safety are gained by spawning new tasks. The ability to implement recursive remote messaging is an important feature of the present invention, for example when user interaction is required to perform the desired task.

The present invention can also be implemented in a client/server setup. In the client/server setup, both the client and the server begin independently. Communication is through an agreed upon method. The client and server can communicate with each other by looking for a manager for the communications channel (e.g. network).

The present invention provides a new alternative for developing extensible programs. Instead of adding functionality by adding code that defines new object classes and then loading that code into a main program, a new program is created and forked. If there are any errors in the new program, they reside outside the main program improving performance. In addition, processing is parallel and asynchronous, leading to improved performance.

In one embodiment, the first time a message is sent to a proxy, the receiver is asked for the method signature in order to allow the proxy's domain to encode the arguments. This can increase communication time. One alternative embodiment provides for prior agreement between processes so that two tasks know in advance the method signatures for their proxies. Alternatively, when prior agreement is not possible due to the dynamic nature of the required exchange, the atomicity of the signature request can be changed to communicate all the public signatures for a given proxy, resulting in a single "meta-protocol" transaction for the proxy.

When an object is passed by reference, a new proxy is typically created. The present invention includes safeguards to guarantee that if a remote object is encoded twice, the same proxy (in the pointer equality sense) will be obtained in the local domain. This unicity of proxies is maintained by a table which maps tokens of remote objects to their local proxies and looks for previously created proxies when an object pass by reference is decoded. The present invention keeps all proxies until the communication with the remote domain ends. At that time, the table is used to de-allocate all proxies.

Figure 3A:
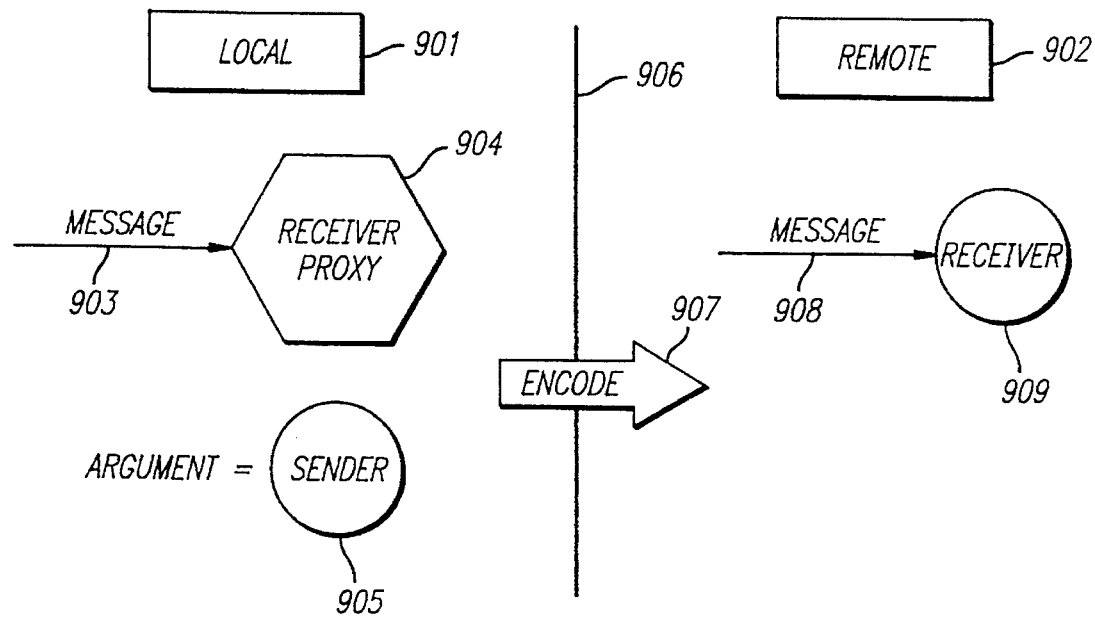
FIGS. 3A–3C illustrate the distributed processing object oriented programming system of the present invention.
Figure 3B:
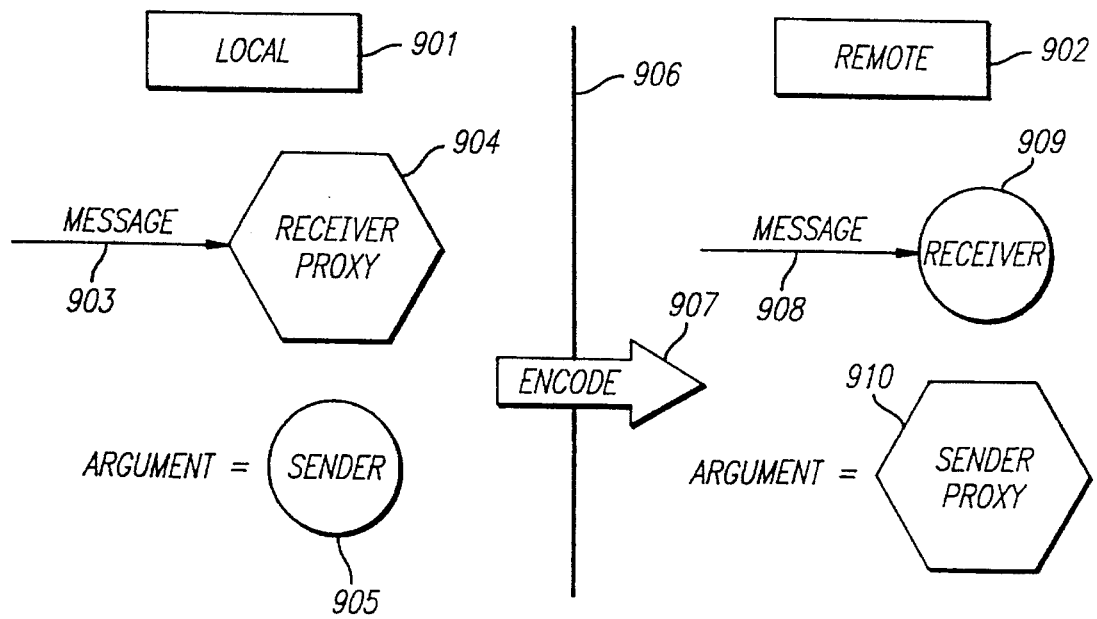
Figure 3C:
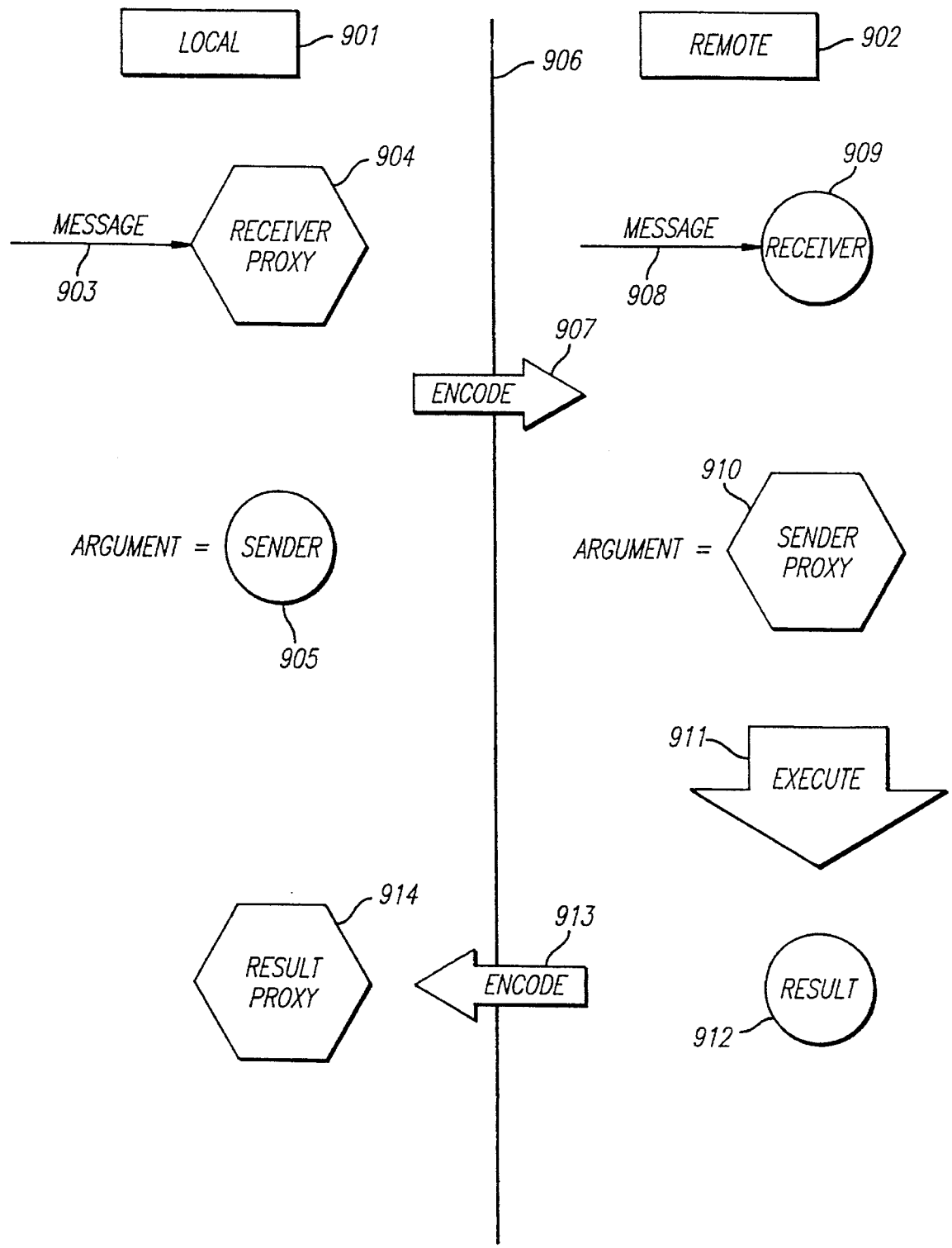

The operation of the present invention is illustrated in FIGS. 3A–3C. Referring first to FIG. 3 A, a local process 901 is separated from a remote process 902 by boundary 906. The boundary 906 could be a separation between programs on the same computer or it could represent the separation of two different machines on a network. The local process 901 includes a sender object 905 that sends a message to receiver object 909. The object 909 is located in the remote process 902. However, the sender object 905 can send its message 903 to the remote object as if it were a local object.

The local process 901 includes a receiver proxy 904 that accepts the message 903. The receiver proxy 904 is an object that executes a forward:: method. The receiver proxy 904 encodes the message and transmits it across the process boundary to the remote object. In the preferred embodiment of the present invention, the proxy 904 encodes the message, (which is a language based message such as, for example, an objective C message), as an operating system message, such as a Mach message 907, and transmits it to the receiver object 909 in the remote process 902. The receiver object 909 decodes the Mach message into a language based message for execution or handling in the remote process 902.

The present invention supports nested, recursive, remote messages. That is, when a message is sent to a remote object, that remote object may send other messages back to the local process (which may again send other remote messages), as part of its calculations before providing a reply to the initial message. These messages may be nested arbitrarily deep. If only the sender itself is sent as an argument, (such as illustrated in FIG. 3 A), the receiver determines what further information is required from the sender and sends messages back to the local process to obtain that information before generating a reply.

Referring to FIG. 3 B, the receiver object 909 requires additional information from the sender object so it generates a request message to the sender object 904. However, since the sender object 904 is not resident in the remote process 902, a sender proxy 910 is created in the remote process 902. The sender proxy 910 encodes the request into a Mach message and transmits it across process boundary 906 to sender object 905. The Mach message is decoded into a language based message and generates a response. This response is sent back to the receiver object 909, (again via receiver proxy 904).

Referring to FIG. 3 C, the receiver object 909 then performs an execute 911 on the original message to generate a result object 912. The result object 912 is encoded 913 and transmitted across process boundary 906 to result proxy 914 in local process 901.

In the present invention, proxies are not required to be created in advance. Once one proxy of a remote process exists, N proxies can be created for communication with that process. The present invention also permits the sending of objects themselves across process boundaries.

The recursive nature of the present invention is useful when the remote object does not recognize a method sent to it by a local object. For example, the local object may send a message to a remote object requesting it to execute the method "foo". If the remote object does not recognize the method, it can ask the sending object "what is foo?" All objects recognize the method "what is". The sender object can then respond with instructions concerning the nature of the method being investigated. For example, the sender can reply that foo is a method that requires an integer. If no integer has been provided, the remote object can then request the integer.

The creation of the first proxy is provided automatically in the present invention. The first time a process is accessed, it must call a process referred to as the "proxy receptionist". By definition, the first call to a new process is to be at sequence number 0. The first proxy by definition has a sequence number of 0. Subsequent proxies, as needed, are defined and the sequence numbers are provided to the other process.

In the preferred embodiment of the present invention, communication between processes is implemented in a master/slave or client/server relationship. In the case of a client/server relationship, the server may "publish" its port in an appropriate place on the system. The client looks up this port and then uses it to initiate the bootstrap-meta-protocol described above.

The establishment of a connection defines only the first proxy on each side. Proxies for any other objects that need to be communicated are created dynamically as they are encountered. For example, if a remote method returns a new object, a new proxy is created when decoding the result locally, such that the local program could send a message to this new remote object without any explicit setup.

Once a connection is established, a message may be sent (in either direction). To send a message, the arguments must be encoded into a form that is representable in a Mach message, so that the receiver may decode them correctly. To do this, the sender must know the method signature of the message. The method signature is part of the "protocol" that both sender and receiver must understand in order to communicate, and is a domain-independent encapsulation of the method name, its argument types, and its return value type.

Although a protocol may be arranged by prior agreement in many cases, the present invention determines the protocol dynamically by asking the receiver how to encode the arguments for each message as it is encountered. During the first attempt to send a given message to a remote object, the local domain consults the remote domain to get the signature corresponding to the actual class implementation that will ultimately receive the message. This method signature is cached on a per-connection basis, with the assumption that the class of a remote object will not change for the duration of the connection. Thus, subsequent messages use the cached signature, and do not have the overhead of this "meta-protocol" transaction. This dynamic aspect is useful for type checking, and allows one program to "learn" how to talk to another program.

The argument encoding for standard C data types is explicit and strictly pass-by-value, and maps substantially directly onto a Mach message. Pointers to C data structures are not encoded. Arguments that are first-class objects (as opposed to simple C data types) are handled specially; they are asked to encode themselves. The default encoding scheme that most objects inherit is to allocate a token (if one does not already exist) in the local domain, and encode only that token. Along with the port of the local domain, this constitutes an object reference (via proxy), and when it is decoded on the receiving side, results in a new proxy for that remote object.

Thus, first-class objects by default get passed by reference instead of by value. For example, when domain A sends a message with object X as an argument to a remote object in domain B, a new proxy is created in domain B to represent X. Any subsequent message that domain B sends to X results in another remote object transaction. In the present invention, an implementation of an object class is free to choose to implement a different encoding scheme, for example one that encodes the object by value, though this requires that both sender and receiver implement that class of object. The "pass-by-proxy" scheme does not have this restriction and is generally preferred.

Because objective C implements functional messages, a return value is always returned in a reply message. It is encoded exactly the same way as arguments are. In particular, if the result is an object or a proxy, it is encoded as a proxy or an object, respectively, in the other domain. The reply message also encodes information about errors or exceptions that may have occurred, so that they can be raised in the local context. That is, an error occurring while executing a message sent to a remote object is caught and returned to the caller, so that the exception is raised in the local domain. This makes error handling transparent. Remote exceptions may be handled the same way as local exceptions.

The use of a single port to represent a domain of objects allows an efficient and simple implementation. A one-way message is used when forwarding a message to a remote domain. Messages are received on the local domain's single published port while waiting for the reply. Since all messages (including both the reply message and any other messages initiated from remote domains) arrive on the same port, each one can be handled serially. There is no global state to keep track of (the logic is implemented in a re-entrant manner), and each message and reply have matching sequence numbers, so it can be determined when the correct reply has been received.

In effect, the low level routine to actually forward the message to the remote domain becomes the main loop of the program until the reply is received. There may be many nested levels of this low level routine at one time. Outside the scope of a locally-initiated remote message (i.e., the "idle" state of waiting asynchronous messages to arrive), the local domain's port is listened to by the main program, along with other non-remote-object related events. This approach contrasts with that of the prior art McCullough system, where a process or thread is forked to field every expected reply. The present invention achieves an order of magnitude in performance by avoiding the forking when communicating.

An example of a computer program listing that may be used to implement the present invention is described in Appendix A. This computer program listing is given by way of example only. The present invention may be practiced using other programs and methods as well.

Automatic Forwarding of Messages

The present invention, in its preferred embodiment, takes advantage of a method referred to as "automatic forwarding of messages." This method is the subject of copending patent application Ser. No. 07/695,316 filed May 3, 1991, entitled "METHOD FOR PROVIDING AUTOMATIC FORWARDING OF MESSAGES AND METHODS" and assigned to the assignee of the present invention. This method is described below.

In objective C, when an object receives a message that contains a method that the object does not recognize, an exception is provoked leading to an error. The present invention, instead of provoking an exception, redirects the message to an acquaintance that can understand the message. For example, if an object receives a message containing a method that the receiving object does not contain, the message is forwarded to an acquaintance object that does contain the method. This provides the advantage of inheriting the method from the acquaintance object but does not require the first receiving object to actually have the method itself. This reduces code size the memory requirements.

The present invention has a plurality of uses. For example, a new object class can be defined so that one of its instances (attributed object) adds an attribute to another object (its forwardee). In that situation, automatic forwarding occurs when an attributed object receives a message that is irrelevant to the attribute, and the method is forwarded to the forwardee. In another situation, some functionality is applied before and/or after the forwarding. This can be used in the case of a locking data structure where all methods must be redirected to the locked data after acquiring the lock, and where the lock must be released after the execution of the forwarded method. The present invention also has use in the case of forwarding messages in a distributed environment where there is no explicit forwardee. Rather, there is a network address of the forwardee.

The implementation of the present invention in the preferred embodiment requires trapping the "message not recognized" exception of objective C, retrieving all of the arguments of the unrecognized message, and sending the "forward::" message to the object.

The resulting automatic forwarding system of the present invention is more powerful than multiple inheritance and is transparent to the programmer and developer. The system is general, because the forwardee is not explicit, thus permitting solutions to a large class of problems.

The present invention uses the forward:: command so that subclasses can forward messages to other objects. The format is forward: (SEL) aSelector:(marg_list) argFrame. When an object is sent an aSelector message, and the run time system cannot find an implementation of the method for the receiving object, the run time system sends the object a forward:: message to give it an opportunity to delegate the message to another object. If the forwardee object cannot respond to the message either, it also has the opportunity to forward the message. A forward:: message is generated only if a selector method is not implemented by the receiving object's class or by any of the classes it inherits from.

The forward:: message thus allows an object to establish relationships with other objects that will, for certain messages, act on its behalf. The forwarding object is, in a sense, able to "inherit" some of the characteristics of the object it forwards the message to. The forwarding object is not limited to the forwardees it may select, and a forwardee relationships may be formed with more than one object at the same hierarchical level. Therefore, the present invention provides the advantages of multiple inheritance without the code size problem.

In addition to forwarding messages, the forward:: method can locate code that responds to a variety of different messages, thus avoiding the necessity of having to write a separate method for each selector.

If implemented to forward messages, a forward:: method has two tasks. First, to locate an object that can respond to the aSelector message (this need not be the same object for all messages). Second, to send the message to that object using the performv:: and performv method.

Figure 5:
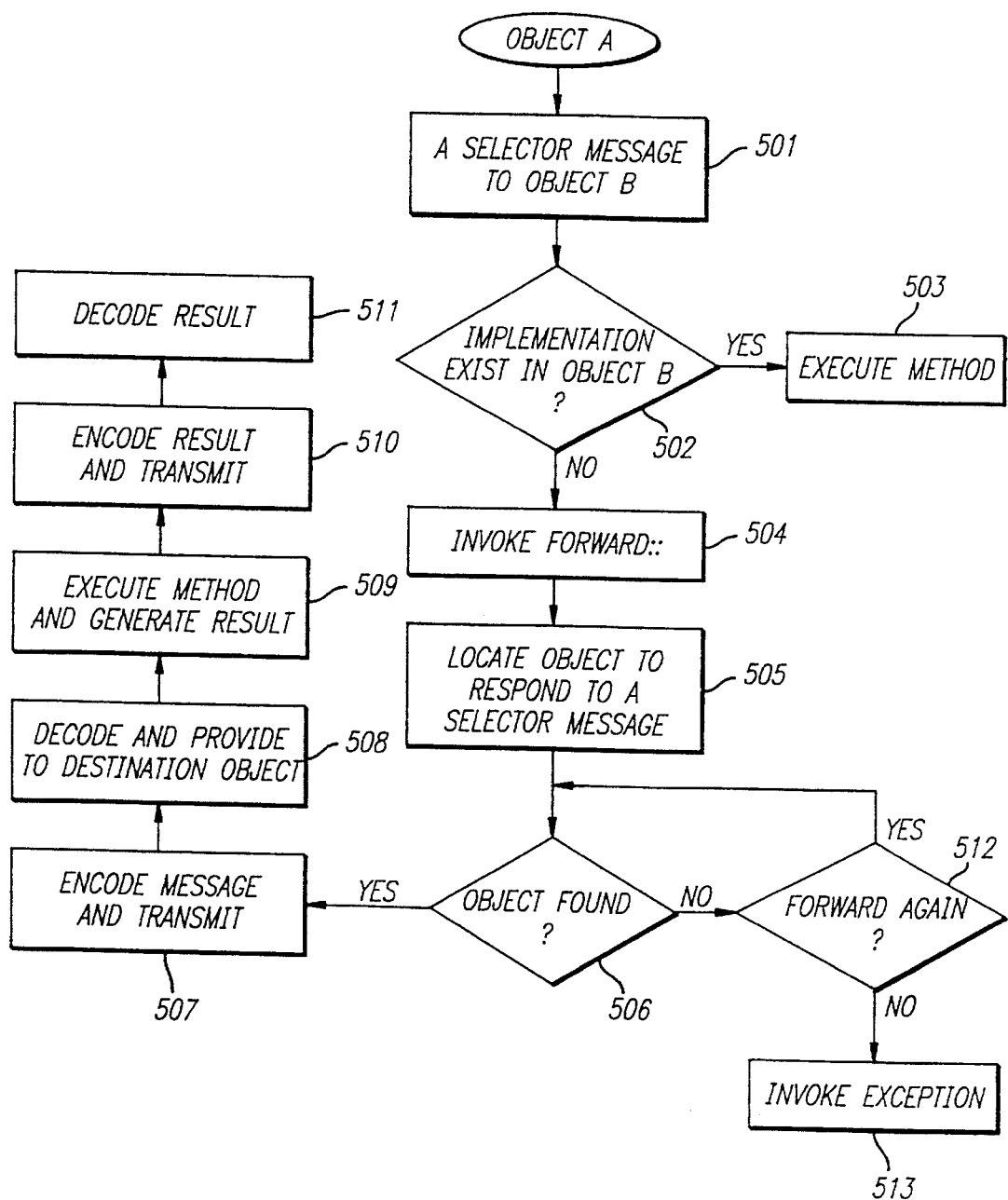
FIG. 5 is a flow diagram of the forwarding method of the present invention.
Figure 6:
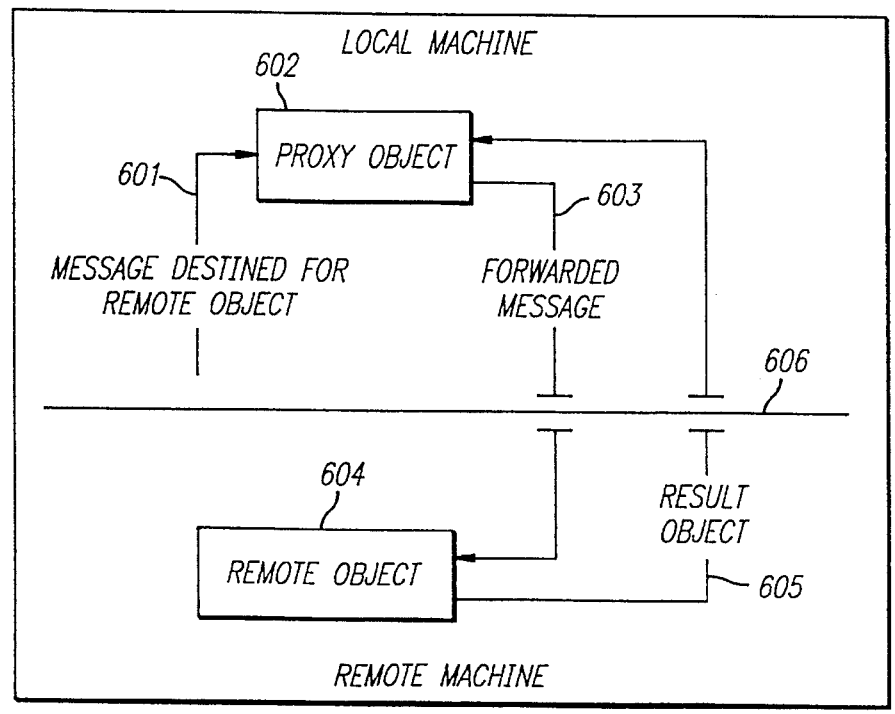
FIG. 6 is a block diagram illustrating the prior art distributed processing object-oriented programming system.
Figure 7:
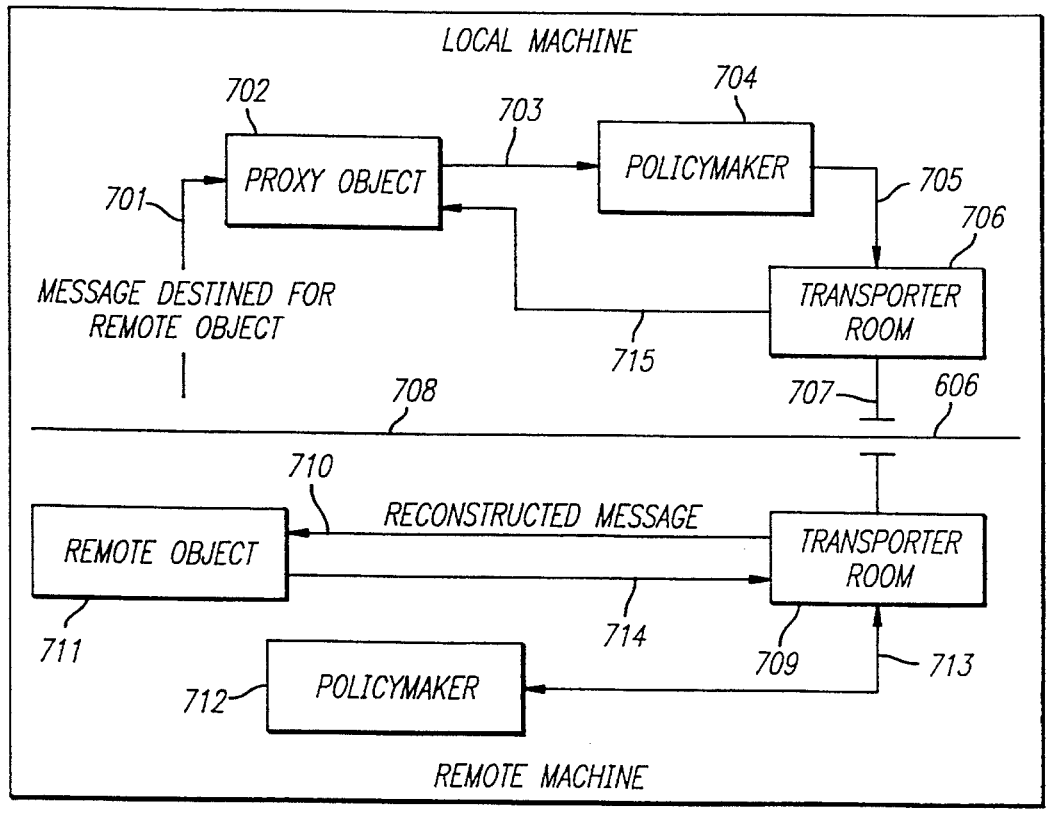
FIG. 7 is a block diagram illustrating another prior art distributed processing object-oriented programming system.
Figure 8A:
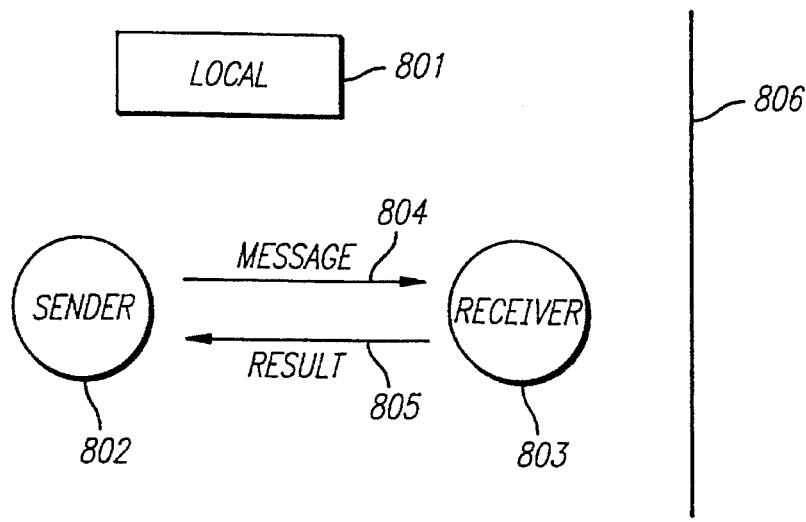
FIGS. 8A and 8B illustrate non-distributed programming systems.
Figure 8B:
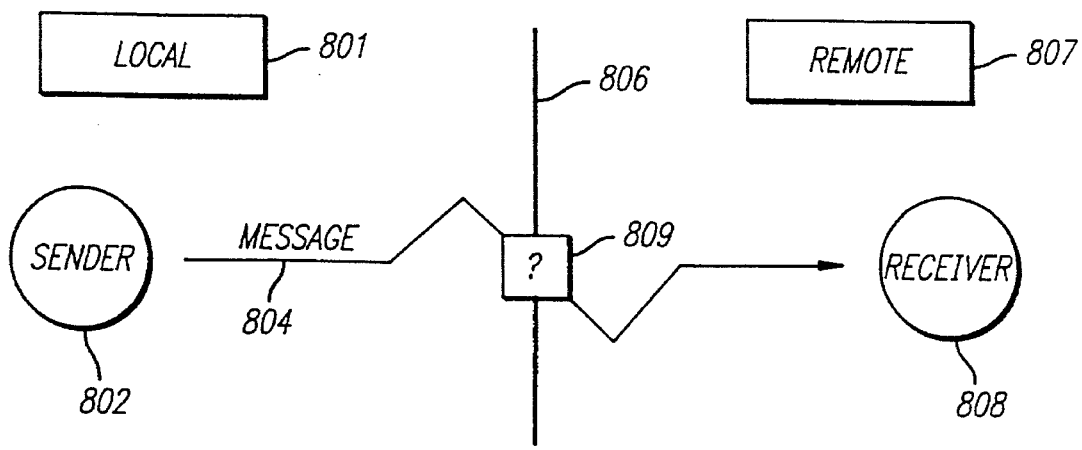

The operation of the present invention is illustrated in the flow diagrams of FIG. 5. At step 501, Object A sends an aSelector message to object B. At decision block 502, the argument "Implementation exists in Object B?" is made. If the argument is true, the method of the aSelector message can be executed by object B. If that is the case, the system proceeds to step 503 and the method is executed. If the argument is not true, the system proceeds to step 504 and invokes the forward:: method.

The forward:: method then performs the first of its two tasks at step 505. Namely, it attempts to locate an object to respond to the aSelector message. At decision block 506, the argument "Object found?" is made. If the argument is true, then forward:: has successfully found an object to respond to the aSelector message. In the present invention, the forwarding object is typically a proxy object.

The system then proceeds to step 507, the message is encoded and transmitted as an operating system message to another process. At step 508, the operating system message is decoded and provided to the destination object. At step 509, the destination object executes the method of the message to generate a result. At step 510, the result is encoded and transmitted to the first process as an operating system message. At step 511, the message is decoded and the result is provided to the sending object.

If the argument at decision block 506 is not true, the system proceeds to decision block 512. At decision block 512, the argument "forward again?" is made. If the argument is true, the message is forwarded again and a search for an object to respond to the message is made. If the argument is false, the system proceeds to step 513 and an exception (error) is invoked.

In the case in which an object forwards messages to just one destination, a forward:: method could appear as follows:

```
- forward: (SEL)aSelector :(marg_list)argFrame
{
    if ([friend respondsTo:aSelector])
        return [friend performv:aSelector:argFrame}:
    return [self doesNotRecognize:aSelector];
}
```

ArgFrame is a pointer to the arguments included in the original aSelector message. It is passed directly to performv:: without change. The default version of forward:: implemented in the object class invokes the does not recognize: method. It does not forward messages. Thus, if a user chooses not to implement forward:: methods, unrecognized messages will be handled in the usual way.

The objective C run time code routines for implementing automatic forwarding of messages is as follows:

```
// provide a default error handler for unrecognized messages
static id-forward (id self, SEL sel, . . .)
{
    id    retval;
    // the following test is not necessary for Objects (instances of
    Object)
    // because forward:: is recognized.
    if (sel ==@selector (forward::)) }
            _objc_error (self, _errDoesntRecognize, SELNAME
    (sel));
            return nil;
    }
    retval =[self forward: sel : &self];
    return retval;
    {
            Method smt =(Method) objc_malloc (sizeof (struct
            objc_method));
            smt->method_name sel;
            smt->method_types = "";
            smt->method_imp = (IMP)_forward;
            _cache_fill (savCls, smt);
    }
    {
            Method smt = (Method) objc_malloc (sizeof (struct
            objc_method));
            smt->method_name = sel;
            smt->method_types = "";
            smt->method_imp = (IMP)_forward;
                cache_fill (savCls, smt);
    }
    // the class does not respond to forward: (or, did not supply a
    dest)
    {                    ,
            Method smt = (Method) objc_malloc (sizeof (struct
            objc_method));
            smt->method_name = sel;
            smt->method_types = "";
            smt->method_imp = (IMP)_forward;
                _cache_fill (savCls, smt);
    }
    return (IMP)_forward;
}
```

Thus, a method and apparatus for providing distributed processes is described.

APPENDIX A

```
#import <stdlib.h>
#import <stdarg.h>
#import <objc/HashTable.h>
#import <objc/hashtable.h>
import <sys/message.h>

/* Declarations that will go away */
extern SEL _sel_registerName(STR key);

/***************    Definitions    ***********************/ extern int defaultCommTimeout; /* in millisecs, <0 means infinite */ extern int remoteMessageReceiveCount; /* increments when a msg is received */

/*      The following type of function may be passed to the beginListeningOn:rootObject: m
ethod.  It gets asynchronously called during remote message sending. For example, an app co
uld register the port and function with DPSAddPort when the boolean is YES (and DPSRemoveP
ort when NO). */
typedef void (*remote_message_handler_t)(msg_header_t *msg, void *userData);

typedef void (*receive_enable_proc_t)(port_t port, remote_message_handler_t fun, BOOL shou
ldEnable);

typedef enum {
    #define REMOTE_EXCEPTION_BASE 36000 /* less than appkit base */
    /* Format of exceptions is a label and a message string    */
    GENERIC_REMOTE_EXCEPTION = REMOTE_EXCEPTION_BASE,
    TIMEOUT_REMOTE_EXCEPTION,
    LAST_REMOTE_EXCEPTION
} RemoteException;

/*****************    Communication    *************************/

@interface Communication: Object {
    @public
    port_t         sendPort;
    int            timeout;        /* in milliseconds */
    NXHashTable    *objectsGivenAway;
    NXHashTable    *allProxies;
}
+ beginListeningOn:(port_t)listenPort enableProc:(receive_enable_proc_t)aProc;
    /* Initialize the remote object system.
       enableProc is called immediately with a boolean of YES. */

+ new:(port_t)port timeout:(int)aTimeout;
+ findCommForPort:(port_t)aPort;

@end

/*****************    Remote Objects    *************************/

@interface RemoteObject: Object {
    Communication    *comm;   /* nil means "local" */
    unsigned         name;           /* object name; 0 means localRoot */
    HashTable        *knownSelectors;        /* cache */
}

+ messageReceived:(msg_header_t *)msg;
```

```
+ newRemote:(unsigned)remoteName withCommunication:(Communication *)communication;
    /* This is used only for bootstrap */

+ registerLocalRoot:root;
    /* Register the local root, and return a remote object with name 0;
    Can only be called once */

+ newLocal:local withCommunication:(Communication *)communication;
    /* search for a local-RemoteObject that corresponds to local id.
    If none found, creates one */

- (unsigned)remoteObjectName;

- (unsigned) methodArgSize: (SEL) sel;
    /* Size of the arguments of the remote object, including self and sel;
    0 iff error */
- forward: (SEL) sel : (void *) args;
@end /*************    Encoding Protocol    ************************/

@interface Object (Object_MakeRemote)
- encodeRemotelyFor:(Communication *)communication freeAfterEncoding:(BOOL *)flag;
    /* This method is called for each object being encoded; By default, it consists in cre
ating a new "local" remote object (i.e. passing the object by reference). To pass the obj
ect by value, just return the object. To substitute another object, just return it.
    Iff flag is set, the returned object will be freed after encoding. */

- afterPortReading:(Communication *)communication;
    /* This method is called after decoding an object to give an opportunity to replace it
; original object can be freed */

- instantiateObject:(const char *)className;
- setOutlet:(const char *)outletName with:dest;
@end
```

```
#import "RemoteObject.h"
#import "NXPortStream.h"

#import <string.h>
#import <stdio.h>
#import <libc.h>
#import <cthreads.h>
#import <mach.h>
#import <syslog.h>
#import <objc/error.h>
#import <objc/List.h>
#import <objc/objc-runtime.h>
#import <kern/mach_param.h>
#import <sys/message.h>

/*************    Forward Definitions    ***********************/ static void handleRemoteMessage(msg_header_t *m, void *userData);
static void remoteAsk (port_t port, msg_header_t *msg, int timeout);
#if 0 // Never tried
static void remoteTell(port_t target, msg_header_t *msg, port_t sender, int timeout);
endif /*************    Utilities    ***********************/ int defaultCommTimeout = 15000;
BOOL enableWarning = NO;

static void logv(const char *format, va_list args) {
    printf("RemoteObjects[pid %d]:\t", getpid());
    vprintf(format, args);
} static void ROLog(const char *format, ...) {
    va_list     args;
    va_start(args, format);
    logv(format, args);
    va_end(args);
} static void warning(const char *format, ...) {
    va_list    args;
    va_start(args, format);
    if (enableWarning) logv(format, args);
    va_end(args);
} static void error(const char *format, ...) {
    va_list    args;
    va_start(args, format);
    logv(format, args);
    va_end(args);
    NX_RAISE(GENERIC_REMOTE_EXCEPTION, "Internal error", NULL);
} static int generateSequenceNumber() {
    static int number=0;
    number++;
    if (!number) number = 1;      /* useless */
```

```
        return number;
}

@interface Object (Private_Imports)
- reallyFree;
@end

/***************    Selector Info   **************************/

@interface RemoteMethodInfo: Object {
    NXAtom      typedesc;
} static RemoteMethodInfo *knownRemoteMethodInfo = nil;

+ localMethodInfoFor:(Class)class :(SEL)sel;
    /* Return RemoteMethodInfo for a local method;
    Can return nil */

- encodeMethodParams:(void *)args onto:(NXPortStream *)stream;
    /* encode the method frame onto stream (excluding self and sel) */

- (void *)decodeMethodParamsFrom:(NXPortStream *)stream;
    /* decode the method frame from stream;
    return a freshly malloced pointer, never NULL (unless error) */

- encodeMethodRet:result onto:(NXPortStream *)stream;
    /* encode the method return value */

- decodeMethodRetFrom:(NXPortStream *)stream;
    /* decode the return value. */

- (unsigned)sizeOfParams;
    /* Return the size of all parameters including self and sel */
@end @implementation RemoteMethodInfo static unsigned hashMethodInfo(const void *info, const void *data) {
    const RemoteMethodInfo    *rm = data;
    return (unsigned)rm->typedesc;      /* depends on the fact its uniqeud */
}
static int isEqualMethodInfo(const void *info, const void *data1, const void *data2) {
    const RemoteMethodInfo    *rm1 = data1;
    const RemoteMethodInfo    *rm2 = data2;
    return (rm1->typedesc == rm2->typedesc);
} static NXHashTablePrototype proto = {hashMethodInfo, isEqualMethodInfo, NXNoEffectFree, 0}
;

static NXHashTable *allMethodInfos = NULL;
+ initialize {
    if (! knownRemoteMethodInfo) {
        allMethodInfos = NXCreateHashTable(proto, 0, NULL);
        knownRemoteMethodInfo = [RemoteMethodInfo localMethodInfoFor: (Class) [Object clas
s] :@selector(remoteMethodInfo:)];
    }
    return self;
}

+ localMethodInfoFor:(Class)class : (SEL)sel {
    Method      method = class_getInstanceMethod(class, sel);
    RemoteMethodInfo    *previous;
```

```
        if (! method) {
                error("*** localMethodInfoFor:: for '%s' with '%s' return nil\n", [(id) class name
], sel_getName(sel));
                return nil;
        }
        self = [super new];
        typedesc = NXUniqueString(method->method_types);
        previous = NXHashGet(allMethodInfos, self);
        if (previous) {[self free]; return previous; }
        NXHashInsert(allMethodInfos, self);
        return self;
}

- encodeRemotelyFor:(Communication *)communication freeAfterEncoding:(BOOL *)flag {
        return self;
}

- writePortStream: (NXPortStream *) stream {
        [super writePortStream: stream];
        warning("writing a Method:%s\n", typedesc);
        NXWritePortTypes(stream, "%", &typedesc);
        return self;
}

- readPortStream: (NXPortStream *) stream {
        [super readPortStream: stream];
        NXReadPortTypes(stream, "%", &typedesc);
        warning("reading a Method:%s\n", typedesc);
        return self;
}

- encodeMethodParams:(void *)args onto:(NXPortStream *)stream {
        struct objc_method    met;
        unsigned      nb;
        unsigned      index = 2; /* skip result, self and sel */
        int           offset0;
        char          *type;
        met.method_types = (char *)typedesc;
        nb = method_getNumberOfArguments(&met);
        NXWritePortTypes(stream, "i", &nb); /* just for redundancy */
        method_getArgumentInfo(&met, 0, &type, &offset0);
        while (index < nb) {
                char          *type;
                int           offset = 0;
                void          *arg;
                method_getArgumentInfo(&met, index, &type, &offset);
                if (! offset) error("*** encodeMethodParams:onto: cannot extract %d argument for t
ype desc %s\n", index, typedesc);
                arg = ((char *)args)+offset-offset0;
                warning("encodeMethodParams:onto: type=%s value=0x%x\n", type, *(void **)arg);
                NXWritePortTypeInternal(stream, type, arg);
                index++;
        }
        return self;
}

- (void *)decodeMethodParamsFrom:(NXPortStream *)stream {
        struct objc_method    met;
        unsigned      nb;
        unsigned      index = 2;
        unsigned      count;
        void          *args;
        int           offset0;
        char          *type;
```

```
        met.method_types = (char *)typedesc;
        nb = method_getNumberOfArguments(&met);
        NXReadPortTypes(stream, "i", &count);
        if (count != nb) {
            error("decodeMethodParamsFrom: incompatible method params");
            return NULL;
        }
        method_getArgumentInfo(&met, 0, &type, &offset0);
        args = calloc([self sizeOfParams], 1);
        while (index < nb) {
            char        *type;
            int         offset = 0;
            void        *arg;
            method_getArgumentInfo(&met, index, &type, &offset);
            if (! offset) error("*** decodeMethodParamsFrom: cannot extract %d argument for ty
pe desc %s\n", index, typedesc);
            arg = ((char *)args)+offset-offset0;
            NXReadPortTypeInternal(stream, type, arg);
            warning("decodeMethodParamsFrom: type=%s value=0x%x\n", type, *(void **)arg);
            index++;
        }
        return args;
}

- encodeMethodRet:result onto:(NXPortStream *)stream {
//?? -> SN: way to get return types?
        if (typedesc[0] == 'v') return self;
        if (typedesc[0] == 'c') {
            //?? BOGUS, of course
            NXWritePortTypeInternal(stream, "i", &result);
        } else {
            NXWritePortTypeInternal(stream, typedesc, &result);
        }
        return self;
}

- decodeMethodRetFrom:(NXPortStream *)stream {
        id          result = nil;/* important init. for result less than 4 bytes */
//?? -> SN: what iff result more than 4 bytes?
        if (typedesc[0] == 'v') return nil;
        if (typedesc[0] == 'c') {
            //?? BOGUS, of course
            NXReadPortTypeInternal(stream, "i", &result);
        } else {
            NXReadPortTypeInternal(stream, typedesc, &result);
        }
        return result;
}

- (unsigned)sizeOfParams {
        struct objc_method  met;
        met.method_types = (char *)typedesc;
        return method_getSizeOfArguments(&met);
}

@end

@interface Object (Object_RemoteMethodInfo)
- remoteMethodInfo:(SEL)sel;
@end

@implementation Object (Object_RemoteMethodInfo)

- remoteMethodInfo:(SEL)sel {
```

```
        return [RemoteMethodInfo localMethodInfoFor:(Class)[self class] :sel];
}

@end

/*****************     Communication    *************************/

@implementation Communication typedef struct _LocalToRemote {
    id               local;
    RemoteObject     *remote;      /* remote->name == (unsigned)local */
} LocalToRemote;

static void freeLocalToRemote(const void *info, void *data) {
    LocalToRemote    *ltr = data;
    [ltr->remote reallyFree];
    free(data);
} static NXHashTablePrototype proxyProto;

static id commList = nil;

static receive_enable_proc_t enableProc = NULL;
static port_t replyPort = PORT_NULL;

+ beginListeningOn:(port_t)listenPort enableProc:(receive_enable_proc_t)aProc {
    replyPort = listenPort;
    port_set_backlog(task_self(),listenPort,PORT_BACKLOG_MAX);
    enableProc = aProc;
    if (enableProc) (*enableProc)(replyPort,handleRemoteMessage,YES);
    return self;
}

+ new:(port_t)port timeout:(int)aTimeout {
    NXHashTablePrototype     protol = NXPtrStructKeyPrototype;
    protol.free = freeLocalToRemote;
    if (! commList) commList = [List new];
    self = [super new];
    sendPort = port;
    timeout = aTimeout;
    objectsGivenAway = NXCreateHashTable(protol, 0, NULL);
    allProxies = NXCreateHashTable(proxyProto, 0, NULL);
    [commList addObject:self];
    return self;
}

+ findCommForPort:(port_t)aPort {
    int index = [commList count];
    while (index--)
        if (((Communication *)[commList objectAt:index])->sendPort == aPort)
            return [commList objectAt:index];
    return nil;
}

- free {
    [commList removeObject:self];
    NXFreeHashTable(objectsGivenAway);
    NXFreeHashTable(allProxies);
    return [super free];
}

- beforeEncoding:object onto:(NXPortStream *)stream freeAfterEncoding:(BOOL *)flag {
```

```
        return [object encodeRemotelyFor: stream->communication freeAfterEncoding:flag];
}

- afterDecoding:object from:(NXPortStream *)stream {
    return [object afterPortReading: stream->communication];
}

@end

/***************   Remote Objects   ***********************/ static id localRoot = nil;
static id localRemoteForRoot = nil;

@implementation RemoteObject

+ initialize {
    /* We have to initialize knownRemoteMethodInfo! */
    [RemoteMethodInfo initialize];
    return self;
}

+ newRemote:(unsigned)remoteName withCommunication:(Communication *)communication {
    self = [super new];
    comm = communication;
    name = remoteName;
    if (NXHashInsert(communication->allProxies, self)) error("newRemote: already in table!");
    return self;
}

+ newLocal:local withCommunication:(Communication *)communication {
    LocalToRemote     pseudo;
    LocalToRemote    *ltr;
    if (! local) return nil;
    if (local == localRoot) return localRemoteForRoot;
    pseudo.local = local;
    ltr = NXHashGet(communication->objectsGivenAway, &pseudo);
    if (ltr) return ltr->remote;
    ltr = malloc(sizeof(LocalToRemote));
    ltr->local = local;
    ltr->remote = [self new];
    ltr->remote->name = (unsigned)local;
    NXHashInsert(communication->objectsGivenAway, ltr);
    return ltr->remote;
}

+ registerLocalRoot:root {
    if (localRoot) error("registerLocalRoot: root registered twice!");
    localRoot = root;
    return (localRemoteForRoot = [self new]);
}

+ messageReceived:(msg_header_t *)msg {
    handleRemoteMessage(msg, NULL);
    return self;
}

- reallyFree {
    [knownSelectors free];
    return [super free];
}

- free {
```

```
        syslog(LOG_ERR, "Remote Object 0x%x received free", self);
        return nil;
    } static unsigned hashProxy(const void *info, const void *data) {
        return ((RemoteObject *)data)->name;
    } static int isEqualProxy(const void *info, const void *data1, const void *data2) {
        return ((RemoteObject *)data1)->name == ((RemoteObject *)data2)->name;
    } static void freeProxy(const void *info, const void *data) {
        [(id)data reallyFree];
    } static NXHashTablePrototype proxyProto = {hashProxy, isEqualProxy, freeProxy, 0};

- (unsigned)remoteObjectName { return name; }

- remoteMethodInfo:(SEL)sel {
        id      res;
        id      args[4];
        if (sel == @selector(remoteMethodInfo:)) return knownRemoteMethodInfo; /* to avoid infinite recursion */
        res = [knownSelectors valueForKey:(void *)sel];
        if (res) return res;
//?? -> SN How to fill args cleanly
        bzero(args, sizeof(id)*4);
        {
            Method method = class_getInstanceMethod((Class)[Object class], @selector(remoteMethodInfo:));
            char    *type;
            int     offset2;
            int     offset0;
            SEL     *ref;
            method_getArgumentInfo(method, 0, &type, &offset0);
            method_getArgumentInfo(method, 2, &type, &offset2);
            ref = (SEL *) (((char *)args)+offset2-offset0);
            *ref = sel;
        }
        res = [(id) self forward:@selector(remoteMethodInfo:) :args];
        if (! knownSelectors) knownSelectors = [HashTable newKeyDesc:":"];
        [knownSelectors insertKey:(void *)sel value:res];
        return res;
    }

- encodeRemotelyFor:(Communication *)communication freeAfterEncoding:(BOOL *)flag {
        return self;
    }

- writePortStream: (NXPortStream *) stream {
        [super writePortStream: stream];
        NXWritePortTypes (stream, "ii", &comm, &name);
        return self;
    }

- readPortStream: (NXPortStream *) stream {
        [super readPortStream: stream];
        NXReadPortTypes (stream, "ii", &comm, &name);
        return self;
    }

- afterPortReading:(Communication *)communication {
```

```
        if (! comm) {
            id         previous;
            /* it was local for the other guy */
            warning("in afterPortReading - read Remote %d\n", name);
            comm = communication;
            previous = NXHashGet(communication->allProxies, self);
            if (previous) {
                warning("receiving same name=0x%x previous=0x%x self=0x%x\n", name, previous,
self);
                [self reallyFree];
                return previous;
            }
            NXHashInsert(communication->allProxies, self);
            return self;
        } else {
            LocalToRemote    pseudo;
            LocalToRemote    *ltr;
            pseudo.local = (id)name;
            if (! name) {
                if (! localRoot) error("invariant broken in afterPortReading:");
                [self reallyFree];
                return localRoot;
            }
            ltr = NXHashGet(communication->objectsGivenAway, &pseudo);
            if (! ltr) error("afterPortReading:");
            if ((unsigned)ltr->local != name) {
                error("afterPortReading: broken invariant");
            }
            warning("in afterPortReading - converting Remote %d into local 0x%x\n", name, ltr-
>local);
            [self reallyFree];
            return ltr->local;
        }
}

- (unsigned) methodArgSize: (SEL) sel {
    RemoteMethodInfo    *selInfo = [self remoteMethodInfo:sel];
    if (! selInfo) return 0;
    return [selInfo sizeOfParams];
}

- forward:(SEL)sel :(void *)args {
    char              buffer[MSG_SIZE_MAX];
    msg_header_t      *msg = (msg_header_t *)buffer;
    NXAtom            selName = NXUniqueString(sel_getName (sel));
    int               sequence = generateSequenceNumber();
    NXPortStream      *stream = NXOpenEncodePortStream(msg, sequence, comm);
    RemoteMethodInfo  *selInfo = [self remoteMethodInfo:sel];
    id                result;
    int               errorCode;

if (! selInfo) error("forward:: cannot find remote selector %s", selName);
    warning("entered forward:: self=%d selName=%s\n", name, selName);
    NXWritePortTypes(stream, "@%", &self, &selName);
    [selInfo encodeMethodParams:args onto:stream];
    NXCloseEncodePortStream(stream);
    warning("in forward:: - %d made packet for [0x%x comm:%x %s ...]\n", name, comm, self,
selName);

remoteAsk(comm->sendPort, msg, comm->timeout);

/* let's decode the result */
    warning("in forward:: selName=%s received answer\n", selName);
```

```
    stream = NXOpenDecodePortStream(msg, comm);
    NXReadPortTypes (stream, "i", &errorCode);
    if (errorCode) error("forward:: Error occurred during remote execution");
    result = [selInfo decodeMethodRetFrom:stream];
    NXCloseDecodePortStream(stream);
    warning("in forward:: - %d result decoded for [0x%x comm:%x %s ...]\n", name, comm, se
lf, selName);
    return result;
}

@end

/***************    Object Misc    **************************/

@interface Object (Object_MakeRemote)
- setAction: (SEL) theSelector;
@end

@implementation Object (Object_MakeRemote_Import)
- encodeRemotelyFor:(Communication *)communication freeAfterEncoding:(BOOL *)flag {
    warning("in encodeRemotelyFor - converting local 0x%x (%s) into remote\n", self, [self
 name]);
    return [RemoteObject newLocal:self withCommunication:communication];
}
- afterPortReading:(Communication *)communication {
    return self;
}

- instantiateObject:(const char *)className {
    return [objc_getClass((char *)className) new];
}

- setOutlet:(const char *)outletName with:dest {
    char        methodString[256];
    SEL         sel;
    strcpy(methodString, "set");
    strcat(methodString, outletName);
    strcat(methodString, ":");
    if (methodString[3] >= 'a' && methodString[3] <= 'z')
        methodString[3] += 'A' - 'a';
    sel = _sel_registerName((char *)NXUniqueString(methodString));
#if 0
    if ([self respondsTo:sel]) {
        [self perform:sel with:dest];
    } else {
        object_setInstanceVariable(self, methodString, dest);
    }
#else
    [self perform:sel with:dest];
#endif
    return self;
}

@end

/*************    Message transport    ************************/ define RO_TELL_MSG_ID  (232323)
define RO_ASK_MSG_ID   (323232)
#define RO_REPLY_MSG_ID (233223)

#define DEFAULT_TIMEOUT (15000)

static void remoteReply(port_t rPort, msg_header_t *msg, int timeout);
```

```
static void handleRemoteAsk(msg_header_t *msg, port_t sender, id communication) {
    /*
    ** perform a remote RPC.
    ** This function may call many callouts to enableRemoteListening and
    ** disableRemoteListening as it recurses.
    ** exceptions may arise.
    */
    NXAtom           selName;
    id               volatile result = nil;
    NXPortStream     *stream = NXOpenDecodePortStream(msg, communication);
    char             *args;
    id               self;
    SEL              sel;
    int              errorCode = 0;
    RemoteMethodInfo *selInfo;
    int              sequence = NXGetPortStreamSequence(stream);
    char             buffer[MSG_SIZE_MAX];

warning("in remoteAnswer received packet\n");
    NXReadPortTypes(stream, "@%", &self, &selName);
    warning("in remoteAnswer selName=%s\n", selName);
    sel = sel_getUid((char *) selName);
    if (! sel) error("handleRemoteAsk: received message with unknown sel");
    selInfo = [self remoteMethodInfo:sel];
    args = [selInfo decodeMethodParamsFrom:stream];
    NXCloseDecodePortStream(stream);
    if (! args) { errorCode = -2; goto done; }
    NX_DURING
        result = objc_msgSendv(self, sel, [selInfo sizeOfParams], args);
    NX_HANDLER
        ROLog("**** Error while excuting remote message for [0x%x %s ...]\n", self, selName
);
        errorCode = -1;
    NX_ENDHANDLER;
    free(args);

/* let's encode the result */
done:
    /* we cannot reuse msg here, regrettably, because if we come from DPSClient, we don't
have an 8K buffer but a copy only big enough for the incoming msg; sigh */
    msg = (msg_header_t *)buffer;
    stream = NXOpenEncodePortStream(msg, sequence, communication);
    NXWritePortTypes (stream, "i", &errorCode);
    [selInfo encodeMethodRet:result onto:stream];
    NXCloseEncodePortStream (stream);
    remoteReply(sender, msg, ((Communication*)communication)->timeout);
    warning("in remoteAnswer made return packet\n");
} static void handleRemoteTell(msg_header_t *msg, port_t sender, id communication) {
    const char       *selName;
    NXPortStream     *stream = NXOpenDecodePortStream(msg, communication);
    char             *args;
    id               self;
    SEL              sel;
    int              volatile errorCode = 0;
    RemoteMethodInfo *selInfo;

warning("in handleRemoteTell received packet\n");
    NXReadPortTypes(stream, "@%", &self, &selName);
    warning("in handleRemoteTell selName=%s\n", selName);
    sel = sel_getUid ((char *) selName);
    if (! sel) error("handleRemoteTell: received message with unknown sel");
```

```
        selInfo = [self remoteMethodInfo:sel];
        args = [selInfo decodeMethodParamsFrom:stream];
        NXCloseDecodePortStream (stream);
        if (! args) { errorCode = -2; goto done; }
        NX_DURING
            objc_msgSendv(self, sel, [selInfo sizeOfParams], args);
        NX_HANDLER
            errorCode = -1;
        NX_ENDHANDLER;
        free(args);
    done:
        if (errorCode) warning("**** Error executing handleRemoteTell %d\n", errorCode);
} int remoteMessageReceiveCount = 0;
static void handleRemoteMessage(msg_header_t *msg, void *userData) {
        port_t      sender = msg->msg_remote_port;
        id          communication = [Communication findCommForPort:sender];
        if (! communication) {
            syslog(LOG_ERR, "Received message from zombie");
            return;
        }
        remoteMessageReceiveCount++;
        if (msg->msg_id == RO_TELL_MSG_ID) {
            handleRemoteTell(msg,sender, communication);
        } else if (msg->msg_id == RO_ASK_MSG_ID) {
            handleRemoteAsk(msg,sender, communication);
        } else
            syslog(LOG_ERR,"Bogus remote message");
} if 0 // Should work, but has never been used/tested
static void remoteTell(port_t target, msg_header_t *msg, port_t sender, int timeout) {
        int err, sndOptions = SEND_SWITCH;

msg->msg_remote_port = target;
        msg->msg_local_port = sender;
        msg->msg_id = RO_TELL_MSG_ID;
        if (timeout >= 0)
            sndOptions |= SEND_TIMEOUT;
        err = msg_send(msg,sndOptions,timeout);
        if (err) error("remoteTell: cannot send");
}
endif static void remoteReply(port_t rPort, msg_header_t *msg, int timeout) {
        int err, sndOptions = SEND_SWITCH;
        msg->msg_remote_port = rPort;
        msg->msg_local_port = PORT_NULL;
        msg->msg_id = RO_REPLY_MSG_ID;
        if (timeout >= 0)
            sndOptions |= SEND_TIMEOUT;
        err = msg_send(msg,sndOptions,timeout);
        if (err) error("remoteReply: cannot send");
} static nestingLevel=0;

static void remoteAsk(port_t target, msg_header_t *msg, int timeout) {
        int err;
        int volatile sndOptions = SEND_SWITCH;
        int volatile rcvOptions = RCV_NO_SENDERS | RCV_INTERRUPT;
        msg->msg_remote_port = target;
```

```
    msg->msg_local_port = replyPort;
    msg->msg_id = RO_ASK_MSG_ID;
    if (timeout >= 0) {
        sndOptions |= SEND_TIMEOUT;
        rcvOptions |= RCV_TIMEOUT;
    }
    nestingLevel++;
    if (nestingLevel == 1 && enableProc)
        (*enableProc)(replyPort,handleRemoteMessage,NO);
NX_DURING
        err = msg_send(msg,sndOptions,timeout);
        if (err) error("remoteAsk: cannot send");
        else {
            while (1) {
                msg->msg_size = MSG_SIZE_MAX;
                msg->msg_local_port = replyPort;
                err = msg_receive(msg,rcvOptions,timeout);
                if (err) {
                    ROLog("remoteAsk: cannot receive or timeout\n");
                    NX_RAISE(TIMEOUT_REMOTE_EXCEPTION, "Cannot receive", NULL);
                } else {
                    if (msg->msg_id == RO_REPLY_MSG_ID) {
                        break;
                    } else
                        handleRemoteMessage((msg_header_t *)msg, NULL);
                        //?? IF OUT OF LINE, DEALLOCATE HERE
                }
            }
        }
    nestingLevel--;
    if (!nestingLevel && enableProc)
        (*enableProc)(replyPort,handleRemoteMessage,YES);
NX_HANDLER
    nestingLevel--;
    if (!nestingLevel && enableProc)
        (*enableProc)(replyPort,handleRemoteMessage,YES);
    NX_RERAISE ();
NX_ENDHANDLER;
}
```

```
/* This module simply allows NXStrings to be passed across address spaces.
The principle is: to encode a NXString, make a temporary object holding the string, encode
  its characters, free the temporary; to decode a NXString, decode the temporary object, re
place by an immutable string, free the temporary. */ import "../lowlevel.subproj/NXString.h"

import "RemoteObject.h"
#import "NXPortStream.h"

#import <string.h>
#import <stdio.h>

@interface _TemporaryStringHolder: Object {
    @public
    NXString    *string;
}
@end @implementation _TemporaryStringHolder

- writePortStream:(NXPortStream *)stream {
    unsigned    length = [string length];
    NXChar      *chars = malloc(length*sizeof(NXChar));
    [super writePortStream: stream];
    [string setChars:chars];
    NXWritePortTypes(stream, "i", &length);
    NXPortEncodeBytes(stream, (char *)chars, length);
    free(chars);
    return self;
}

- readPortStream: (NXPortStream *) stream {
    unsigned    length;
    NXChar      *chars;
    [super readPortStream: stream];
    NXReadPortTypes(stream, "i", &length);
    chars = malloc(length*sizeof(NXChar));
    NXPortDecodeBytes(stream, (char *)chars, length);
    string = [NXImmutableString newFor:length chars:chars];
    free(chars);
    return self;
}

- afterPortReading:(Communication *)communication {
    NXString    *res = string;
    [self free];
    return res;
}

@end

@interface NXString (NXString_RemoteObject_Coding)
- encodeRemotelyFor:(Communication *)communication freeAfterEncoding:(BOOL *)flag;
@end @implementation NXString (NXString_RemoteObject_Coding)
- encodeRemotelyFor:(Communication *)communication freeAfterEncoding:(BOOL *)flag {
    _TemporaryStringHolder    *new = [_TemporaryStringHolder new];
```

```
    new->string = self;
    *flag = YES;
    return new;
}

@end
```

```
*/ import <objc/Object.h>
import <objc/hashtable.h>
import <sys/message.h> extern SEL _sel_registerName(STR key);
    //?? will go away

/************     Definitions     ***********************/ typedef struct _NXPortStream {
    msg_header_t    *msg;
//?? DO SIZE TEST LATER
    BOOL            write;          /* writing vs reading */       //REMOVE AFTER DEBUG!
    id              communication;
    char            *chars;
    int             nbchars;
    int             maxchars;
    int             *ints;
    int             nbints;
    int             maxints;
} NXPortStream;

@interface Object (Communication_Calls)
- beforeEncoding: object onto: (NXPortStream *) stream freeAfterEncoding:(BOOL *)flag;
    /* will encode the returned object; if flag is set, returned object will be send 'free
' after encoding */
- afterDecoding: object from: (NXPortStream *) stream;
    /* will replace the decoded object by the returned object */
@end /**************     global operations     *******************/ extern NXPortStream *NXOpenEncodePortStream(msg_header_t *msg, int sequence, id communicat
ion);

extern NXPortStream *NXOpenDecodePortStream(msg_header_t *msg, id communication);
        /* buffer is char[MSG_SIZE_MAX];

If mode is NX_WRITEONLY, creates a NXPortStream, ready for writing, given a physic
al stream on which to actually put the bytes. If mode is NX_READONLY, creates a NXPortStre
am, ready for reading, given a physical stream on which to actually get the bytes. The ca
ller is responsible for closing physical. If the file format mismatches right from the st
art with stream format, NULL is returned, otherwise an exception might be raised.

Iff read, have buffers point to msg */ extern void NXCloseEncodePortStream(NXPortStream *stream);
    /* Copy buffers into message and prepare msg for msg_send;
    free stream */ extern void NXCloseDecodePortStream(NXPortStream *stream);
    /* free stream */ extern int NXGetPortStreamSequence(NXPortStream *stream);

/**************     Read/Write data     **********************/ void NXPortEncodeBytes(NXPortStream *stream, const char *bytes, int count);
```

```
*/ import <objc/Object.h>
import <objc/hashtable.h>
import <sys/message.h> extern SEL _sel_registerName(STR key);
    //?? will go away

/**************    Definitions       **********************/ typedef struct _NXPortStream {
    msg_header_t      *msg;
//?? DO SIZE TEST LATER
    BOOL       write;            /* writing vs reading */      //REMOVE AFTER DEBUG!
    id         communication;
    char       *chars;
    int        nbchars;
    int        maxchars;
    int        *ints;
    int        nbints;
    int        maxints;
} NXPortStream;

@interface Object (Communication_Calls)
- beforeEncoding: object onto: (NXPortStream *) stream freeAfterEncoding:(BOOL *)flag;
    /* will encode the returned object; if flag is set, returned object will be send 'free
' after encoding */
- afterDecoding: object from: (NXPortStream *) stream;
    /* will replace the decoded object by the returned object */
@end /***************    global operations       *******************/ extern NXPortStream *NXOpenEncodePortStream(msg_header_t *msg, int sequence, id communicat
ion);

extern NXPortStream *NXOpenDecodePortStream(msg_header_t *msg, id communication);
    /*  buffer is char[MSG_SIZE_MAX];

If mode is NX_WRITEONLY, creates a NXPortStream, ready for writing, given a physic
al stream on which to actually put the bytes. If mode is NX_READONLY, creates a NXPortStre
am, ready for reading, given a physical stream on which to actually get the bytes. The ca
ller is responsible for closing physical. If the file format mismatches right from the st
art with stream format, NULL is returned, otherwise an exception might be raised.

Iff read, have buffers point to msg */ extern void NXCloseEncodePortStream(NXPortStream *stream);
    /* Copy buffers into message and prepare msg for msg_send;
    free stream */ extern void NXCloseDecodePortStream(NXPortStream *stream);
    /* free stream */ extern int NXGetPortStreamSequence(NXPortStream *stream);

/**************    Read/Write data       *********************/ void NXPortEncodeBytes(NXPortStream *stream, const char *bytes, int count);
```

```
void NXPortDecodeBytes(NXPortStream *stream, char *bytes, int count);

extern void NXWritePortTypes(NXPortStream *stream, const char *type, ...);
    /* Restricted to monochar type descriptions;
      Last arguments specify addresses of values to be written.
      It might seem surprising to specify values by address, but this is extremely conve
nient for copy-paste with NXReadPortTypes calls.  A more down-to-the-earth cause for this
passing of addresses is that values of arbitrary size is not well supported in ANSI C for
functions with variable number of arguments. */ extern void NXReadPortTypes(NXPortStream *stream, const char *type, ...);
    /* Restricted to monochar type descriptions;
      Last arguments specify addresses of values to be read.  Expected type is checked a
gainst the type actually present on the stream. */ extern void NXWritePortTypeInternal(NXPortStream *stream, const char *type, const void *da
ta);
extern void NXReadPortTypeInternal(NXPortStream *stream, const char *type, void *data);

/***************         errors        ****************************/

/* several exceptions can occur; the format of all exceptions raised is a label, a message
 string and maybe some extra information */ define PORTSTREAM_ERROR_BASE 37000      /* less than appkit base */ typedef enum _PortStreamErrors {
    PORTSTREAM_CALLER_ERROR = PORTSTREAM_ERROR_BASE,
    PORTSTREAM_INCONSISTENCY,
    PORTSTREAM_INTERNAL_ERROR
} PortStreamErrors;

@interface Object (Object_PortStream_Calls)
- writePortStream: (NXPortStream *) stream;
- readPortStream: (NXPortStream *) stream;
@end
```

```
/*      NXPortStream.m
        Copyright 1989, NeXT, Inc.
        Bertrand 1989

*/ import "NXPortStream.h"

import <stdlib.h>
#import <stdarg.h>
#import <stdio.h>
#import <string.h>
#import <syslog.h>
#import <mach.h>
#import <libc.h>
#import <objc/error.h>
#import <objc/objc-class.h>
import <objc/objc-runtime.h> define DEBUG_LEAKS     0

/*************    Utilities        ***********************/ static void BUG(const char *str) {
    syslog(LOG_ERR, "*** RemoteObjects: internal error in %s", str);
    NX_RAISE(PORTSTREAM_INTERNAL_ERROR, str, NULL);
} static void checkExpected(const char *readType, const char *wanted) {
    if (readType == wanted) return;
    if (!readType || strcmp (readType, wanted)) BUG("checkExpected");
}

@implementation Object (Object_PortStream_Calls)
- writePortStream: (NXPortStream *) stream { return self; }
- readPortStream: (NXPortStream *) stream { return self; }
@end /*************    Definitions       ***********************/ typedef struct _remote_message_t {
    msg_header_t    header;
    msg_type_t      sequenceType;
    int             sequence;
    /* following is chars type and chars, int types and ints, etc ... */
} remote_message_t;

static void PortInternalWriteObject(NXPortStream *stream, id object);
    /* write an object without header */
static id PortInternalReadObject(NXPortStream *stream);
    /* read an object without header */

/*************    Coding data       ***********************/ void NXPortEncodeBytes(NXPortStream *stream, const char *buf, int count) {
    while (stream->nbchars + count > stream->maxchars) {
        stream->maxchars += stream->maxchars + 1;
        stream->chars = realloc(stream->chars, stream->maxchars);
    }
    bcopy(buf, stream->chars + stream->nbchars, count);
    stream->nbchars += count;
} void NXPortDecodeBytes(NXPortStream *stream, char *buf, int count) {
```

```
        if (count > stream->nbchars) BUG("NXPortDecodeBytes");
        bcopy(stream->chars, buf, count);
        stream->chars += count;
        stream->nbchars -= count;
} static inline void _NXEncodeChar(NXPortStream *stream, signed char ch) {
    if (stream->nbchars + 1 > stream->maxchars) {
        stream->maxchars += stream->maxchars + 1;
        stream->chars = realloc(stream->chars, stream->maxchars);
    }
    stream->chars[stream->nbchars ++] = ch;
} static inline signed char _NXDecodeChar(NXPortStream *stream) {
    if (stream->nbchars-- <= 0) BUG("_NXDecodeChar");
    return *(stream->chars ++);
} static void _NXEncodeInt(NXPortStream *stream, int x) {
    if (stream->nbints + 1 > stream->maxints) {
        stream->maxints += stream->maxints + 1;
        stream->ints = realloc(stream->ints, stream->maxints * sizeof(int));
    }
    stream->ints[stream->nbints++] = x;
} static int _NXDecodeInt(NXPortStream *stream) {
    if (stream->nbints-- <= 0) BUG("_NXDecodeInt");
    return *(stream->ints++);
} static void _NXEncodeBool(NXPortStream *stream, BOOL x) {
    _NXEncodeInt(stream, (x) ? 1 : 0);
} static BOOL _NXDecodeBool(NXPortStream *stream) {
    int     x = _NXDecodeInt(stream);
    if (x && x!=1) BUG("_NXDecodeBool");
    return x;
} static inline void _NXEncodeFloat(NXPortStream *stream, float x) {
    NXPortEncodeBytes(stream, (char *) &x, sizeof(float));
} static inline float _NXDecodeFloat(NXPortStream *stream) {
    float       x;
    NXPortDecodeBytes(stream, (char *) &x, sizeof(float));
    return x;
} static inline void _NXEncodeDouble(NXPortStream *stream, double x) {
    NXPortEncodeBytes(stream, (char *) &x, sizeof(double));
} static inline double _NXDecodeDouble(NXPortStream *stream) {
    double      x;
    NXPortDecodeBytes(stream, (char *) &x, sizeof(double));
    return x;
} static void _NXEncodeChars(NXPortStream *stream, const char *str) {
    _NXEncodeBool(stream, (str) ? YES : NO);
```

```
        if (str) {
            int     len = strlen (str);
            _NXEncodeInt(stream, len);
            NXPortEncodeBytes(stream, str, len);
        }
} static char *_NXDecodeChars(NXPortStream *stream) {
    if (! _NXDecodeBool(stream)) return NULL;
    else {
        int     len = _NXDecodeInt(stream);
        char    *str = (STR) malloc(len+1);
        NXPortDecodeBytes(stream, str, len);
        str[len] = '\0';
        return str;
    }
} static NXAtom _NXDecodeUniqueString(NXPortStream *stream) {
    char    *new = _NXDecodeChars(stream);
    NXAtom  atom = NXUniqueString(new);
    free(new);
    return atom;
}

/*******     global operations      ******/

NXPortStream *NXOpenEncodePortStream(msg_header_t *msg, int sequence, id communication) {
    NXPortStream        *stream = calloc(sizeof(NXPortStream), 1);
    remote_message_t    *head = (remote_message_t *)msg;
    if (! communication) BUG("NXOpenEncodePortStream");
    stream->communication = communication;
    stream->write = YES;
    stream->msg = msg;

head->sequenceType.msg_type_name = MSG_TYPE_INTEGER_32;
    head->sequenceType.msg_type_size = sizeof(int) * 8;
    head->sequenceType.msg_type_number = 1;
    head->sequenceType.msg_type_inline = TRUE;
    head->sequenceType.msg_type_longform = FALSE;
    head->sequenceType.msg_type_deallocate = FALSE;
    head->sequence = sequence;

return stream;
}

NXPortStream *NXOpenDecodePortStream(msg_header_t *msg, id communication) {
    void                *head = ((void *)msg)+sizeof(remote_message_t);
    NXPortStream        *stream = calloc(sizeof(NXPortStream), 1);
    if (! communication) BUG("NXOpenDecodePortStream");
    stream->communication = communication;
    stream->write = NO;
    stream->msg = msg;

if (msg->msg_simple) {
        msg_type_t          *type;
        type = head;
        if (type->msg_type_name != MSG_TYPE_BYTE)
            BUG("NXOpenDecodePortStream-char");
        stream->nbchars = type->msg_type_number;
        head += sizeof(msg_type_t);
        stream->chars = head;
        head += stream->nbchars;
```

```
            type = head;
            if (type->msg_type_name != MSG_TYPE_INTEGER_32)
                BUG("NXOpenDecodePortStream-int");
            stream->nbints = type->msg_type_number;
            head += sizeof(msg_type_t);
            stream->ints = head;
            head += stream->nbints * sizeof(int);

} else {
            msg_type_long_t         *type;
            type = head;
            if (type->msg_type_long_name != MSG_TYPE_BYTE)
                BUG("NXOpenDecodePortStream-char");
            stream->nbchars = type->msg_type_long_number;
            head += sizeof(msg_type_long_t);
            stream->chars = ((char **)head)[0];
            head += sizeof(int);

type = head;
            if (type->msg_type_long_name != MSG_TYPE_INTEGER_32)
                BUG("NXOpenDecodePortStream-int");
            stream->nbints = type->msg_type_long_number;
            head += sizeof(msg_type_long_t);
            stream->ints = ((int **)head)[0];
            head += sizeof(int);

}
    return stream;
}
void NXCloseEncodePortStream(NXPortStream *stream) {
    void                *head = ((void *)stream->msg)+sizeof(remote_message_t);
    if (! stream->write) BUG("NXCloseEncodePortStream");
    /* We pad chars to a multiple of 4; what a hack! */
    stream->nbchars = ((stream->nbchars + 3)/4)*4;
    stream->chars = realloc(stream->chars, stream->nbchars);

/* We test for out-of-line */
    stream->msg->msg_simple = (sizeof(remote_message_t)+sizeof(msg_type_t)+stream->nbchars
+sizeof(msg_type_t)+stream->nbints * sizeof(int) < MSG_SIZE_MAX) && (stream->nbchars <= 40
95) && (stream->nbints <= 4095);

if (stream->msg->msg_simple) {
            msg_type_t              *type;
            type = head;
            type->msg_type_name = MSG_TYPE_BYTE;
            type->msg_type_size = 8;
            type->msg_type_number = stream->nbchars;
            type->msg_type_inline = TRUE;
            type->msg_type_longform = FALSE;
            type->msg_type_deallocate = FALSE;
            head += sizeof(msg_type_t);
            bcopy(stream->chars, head, stream->nbchars);
            head += stream->nbchars;
            free(stream->chars);

type = head;
            type->msg_type_name = MSG_TYPE_INTEGER_32;
            type->msg_type_size = sizeof(int) * 8;
            type->msg_type_number = stream->nbints;
            type->msg_type_inline = TRUE;
            type->msg_type_longform = FALSE;
            type->msg_type_deallocate = FALSE;
            head += sizeof(msg_type_t);
```

```
        bcopy(stream->ints, head, stream->nbints * sizeof(int));
        head += stream->nbints * sizeof(int);
        free(stream->ints);

} else {
        msg_type_long_t         *type;
        vm_address_t            buffer;
        type = head;
        type->msg_type_header.msg_type_name = 0;
        type->msg_type_header.msg_type_size = 0;
        type->msg_type_header.msg_type_number = 0;
        type->msg_type_header.msg_type_inline = FALSE;
        type->msg_type_header.msg_type_longform = TRUE;
        type->msg_type_header.msg_type_deallocate = TRUE;
        type->msg_type_long_name = MSG_TYPE_BYTE;
        type->msg_type_long_size = 8;
        type->msg_type_long_number = stream->nbchars;
        head += sizeof(msg_type_long_t);
        if (vm_allocate(task_self(), (vm_address_t *)&buffer, stream->nbchars, 1) != KERN_SUCCESS)
            BUG("NXCloseEncodePortStream: can't allocate (chars)");
        bcopy(stream->chars, (char *)buffer, stream->nbchars);
        ((int *)head)[0] = buffer;
        head += sizeof(int);
        free(stream->chars);

type = head;
        type->msg_type_header.msg_type_name = 0;
        type->msg_type_header.msg_type_size = 0;
        type->msg_type_header.msg_type_number = 0;
        type->msg_type_header.msg_type_inline = FALSE;
        type->msg_type_header.msg_type_longform = TRUE;
        type->msg_type_header.msg_type_deallocate = TRUE;
        type->msg_type_long_name = MSG_TYPE_INTEGER_32;
        type->msg_type_long_size = sizeof(int) * 8;
        type->msg_type_long_number = stream->nbints;
        head += sizeof(msg_type_long_t);
        if (vm_allocate(task_self(), (vm_address_t *)&buffer, stream->nbints * sizeof(int)
, 1) != KERN_SUCCESS)
            BUG("NXCloseEncodePortStream: can't allocate (ints)");
        bcopy(stream->ints, (char *)buffer, stream->nbints * sizeof(int));
        ((int *)head)[0] = buffer;
        head += sizeof(int);
        free(stream->ints);

}
    stream->msg->msg_type = MSG_TYPE_NORMAL;
    stream->msg->msg_size = head - (void *)stream->msg;

free(stream);
} void NXCloseDecodePortStream(NXPortStream *stream) {
    if (stream->write) BUG("NXCloseDecodePortStream");
    if (! stream->msg->msg_simple) {
        void            *head = ((void *)stream->msg)+sizeof(remote_message_t);
        msg_type_long_t *type;
        type = head;
        if (type->msg_type_long_name != MSG_TYPE_BYTE)
            BUG("NXOpenDecodePortStream-char");
        head += sizeof(msg_type_long_t);
        if (vm_deallocate(task_self(), ((int *)head)[0], type->msg_type_long_number) != KERN_SUCCESS)
            BUG("NXCloseDecodePortStream: can't deallocate (chars)");
```

```
            head += sizeof(int);

type = head;
            if (type->msg_type_long_name != MSG_TYPE_INTEGER_32)
                BUG("NXOpenDecodePortStream-int");
            head += sizeof(msg_type_long_t);
            if (vm_deallocate(task_self(), ((int *)head)[0], type->msg_type_long_number * sizeof(int)) != KERN_SUCCESS)
                BUG("NXCloseDecodePortStream: can't deallocate (ints)");
            head += sizeof(int);

}
        free(stream);
    } int NXGetPortStreamSequence(NXPortStream *stream) {
        remote_message_t    *head = (remote_message_t *)stream->msg;
        return head->sequence;
    }

/*****         Writing and reading arbitrary data        *****/ void NXWritePortTypeInternal(NXPortStream *stream, const char *type, const void *data) {
        switch (*type) {
            case 'c': case 'C': {
                char        cc = 0; /* for padding */
                cc = *((char *)data);
                _NXEncodeInt(stream, cc);
                break;
            }
            case 's': case 'S': {
                short       ss = 0; /* for padding */
                ss = *((short *)data);
                _NXEncodeInt(stream, ss);
                break;
            }
            case 'i': case 'I': case 'l': case 'L':
                _NXEncodeInt(stream, *((int *)data));
                break;
            case 'f':
                _NXEncodeFloat(stream, *((float *)data));
                break;
            case 'd':
                _NXEncodeDouble(stream, *((double *)data));
                break;
            case '@':
                PortInternalWriteObject(stream, *((id *)data));
                break;
            case '*':
#if DEBUG_LEAKS
                syslog(LOG_ERR, "*** Remote Objects: un-freeable string encoding: %s", *((char **)data));
#endif
                _NXEncodeChars(stream, *((char **)data));
                break;
            case '%':
                _NXEncodeChars(stream, *((NXAtom *)data));
                break;
            case ':': {
                SEL         sel = *((SEL *)data);
                char        *str = NULL;
                if (sel) str = sel_getName(sel);
                _NXEncodeChars(stream, str);
                break;
```

```
            }
            case 'I':
                break;
            default: BUG("NXWritePortTypeInternal: unknown type descriptor");
        }
    } void NXReadPortTypeInternal(NXPortStream *stream, const char *type, void *data) {
        switch (*type) {
            case 'c': case 'C': {
                signed char     *ptr = data;
                *ptr = _NXDecodeInt(stream);
                break;
            }
            case 's': case 'S': {
                short       *ptr = data;
                *ptr = _NXDecodeInt(stream);
                break;
            }
            case 'i': case 'I': case 'l': case 'L': {
                int         *ptr = data;
                *ptr = _NXDecodeInt(stream);
                break;
            }
            case 'f': {
                float       *ptr = data;
                *ptr = _NXDecodeFloat(stream);
                break;
            }
            case 'd': {
                double      *ptr = data;
                *ptr = _NXDecodeDouble(stream);
                break;
            }
            case '@': {
                id          *ptr = data;
                *ptr = PortInternalReadObject(stream);
                break;
            }
            case '*': {
                char        **ptr = data;
                *ptr = _NXDecodeChars(stream);
                break;
            }
            case '%': {
                NXAtom      *ptr = data;
                *ptr = _NXDecodeUniqueString(stream);
                break;
            }
            case ':': {
                SEL         *ptr = data;
                NXAtom      selName = _NXDecodeUniqueString(stream);
                *ptr = _sel_registerName((char *)selName);
                break;
            }
            case '!':
                break;
            default: BUG("NXReadPortTypeInternal: unknown type descriptor");
        }
    } void NXWritePortTypes(NXPortStream *stream, const char *type, ...) {
        va_list     args;
        va_start(args, type);
```

```
        /* We could avoid next line at the cost of more painful debug */
        _NXEncodeChars(stream, type);
        while (*type) {
            NXWritePortTypeInternal(stream, type, va_arg(args, void *));
            type = type++; /* we restrict to monochar type descriptions */
        }
        va_end (args);
} void NXReadPortTypes(NXPortStream *stream, const char *type, ...) {
        NXAtom      readType;
        va_list     args;
        va_start(args, type);
        readType = _NXDecodeUniqueString(stream);
        /* We could avoid next line at the cost of more painful debug */
        checkExpected(readType, type);
        while (*type) {
            NXReadPortTypeInternal(stream, type, va_arg(args, void *));
            type = type++; /* we restrict to monochar type descriptions */
        }
        va_end (args);
} static void PortInternalWriteObject(NXPortStream *stream, id object) {
        BOOL        flag = NO;
        if (! [stream->communication respondsTo: @selector (beforeEncoding:onto:freeAfterEncod
ing:)]) BUG("PortInternalWriteObject");
        object = [stream->communication beforeEncoding: object onto: stream freeAfterEncoding:
&flag];
        _NXEncodeBool(stream, (object) ? YES : NO);
        if (object) {
            Class   class = (Class)[object class];
            if (! class) BUG("PortInternalWriteObject: found null class");
            _NXEncodeChars (stream, class->name);
            [object writePortStream: stream];
            _NXEncodeBool(stream, YES);
            if (flag) [object free];
        }
} static id PortInternalReadObject(NXPortStream *stream) {
        id          object;
        if (! _NXDecodeBool(stream)) return nil;
        else {
            NXAtom  className = _NXDecodeUniqueString (stream);
            Class   class = (Class) objc_getClass ((char *) className);
            if (! class) BUG("PortInternalReadObject: class not loaded");
            /* explicit class initialization */
            (void) [(id) class self];
            object = class_createInstance (class, 0);
            [object readPortStream: stream];
            [object awake];
            if (! [stream->communication respondsTo: @selector (afterDecoding:from:)]) BUG("Po
rtInternalWriteObject-1");
            object = [stream->communication afterDecoding: object from: stream];
            if (! _NXDecodeBool(stream)) BUG("PortInternalReadObject-2");
            return object;
        }
}
```

We claim:

1. A method for sending an object oriented programming language based message having dynamic binding from a first object in a first process to a second object in a second process, said method comprising the steps of:

transmitting, using a first processing means, said object oriented programming language based message to a first proxy in said first process;

using said first proxy and said first processing means, encoding said object oriented programming language based message into an operating system based message at run time;

transmitting said operating system based message to said second process in said second processing means at run time;

decoding, using a second process, said operating system based message into a language based message;

transmitting, using said second processing means, said object oriented programming language based message to said second object in said second process;

executing said object oriented programming language based message by said second object in said second process.

2. The method of claim 1 further including the steps of:

said second object in said second process and generating an object oriented programming language based result;

encoding, using said second processing means, said object oriented programming language based result into an operating system based result at run time;

transmitting, using said second processing means, said operating system based result to said first process at run time;

decoding said operating system based result into an object oriented programming language based result at run time, using said first processing means;

transmitting, using said first processing means, said object oriented programming language based result to said first object.

3. The method of claim 1 wherein said object oriented programming language based message comprises a method and an argument.

4. The method of claim 1 wherein said second object executes said method on said argument when executing said message.

5. The method of claim 1 wherein the step of executing said object oriented programming language based message further includes the steps of:

said second object determining, using said second processing means, whether additional information is needed to execute said object oriented programming language based message;

said second object generating, using said second processing means, an object oriented programming language based query if it is determined that additional information is needed;

encoding, using said second processing means, said object oriented programming language based query into an operating system based query at run time if it is determined that additional information is needed;

transmitting said operating system based query to said first process at run time, using said second processing means if it is determined that additional information is needed;

decoding, using said first processing means, said operating system based query into an object oriented programming language based query at run time if it is determined that additional information is needed;

transmitting, using said first processing means, said object oriented programming language based query to said first object if it is determined that additional information is needed.

6. The method of claim 5 further including the steps of:

said first object generating, using said first processing means, an object oriented programming language based reply to said object oriented programming language based query;

encoding said object oriented programming language based reply into an operating system based reply at run time, using said first processing means;

transmitting, using said first processing means, said operating system based reply to said second process at run time;

decoding, using said second processing means, said operating system based reply into an object oriented programming language based reply at run time;

transmitting, using said second processing means, said object oriented programming language based reply to said second object.

7. The method of claim 6 wherein said first processing means and said second processing means are the same processing means.

8. The method of claim 1 wherein said object oriented programming language based message comprises an objective C message.

9. The method of claim 1 wherein said operating system based message comprises a Mach message.

10. The method of claim 1 wherein said first proxy represents said second object.

11. A method for sending an object oriented programming language based message having dynamic binding from a first object in a first process to a second object in a second process, said method comprising the steps of:

transmitting, using a first processing means, said object oriented programming language based message to a first proxy in said first process;

using said first proxy and said first processing means, encoding said object oriented programming language based message into an operating system based message at run time;

transmitting, using said first processing means, said operating system based message to said second process at run time;

decoding, using said second processing means, said operating system based message into an object oriented programming language based message at run time;

transmitting, using said second processing means, said object oriented programming language based message to said second object;

said second object generating an object oriented programming language based query, using said second processing means;

creating, using said second processing means, a second proxy in said second process;

transmitting, using said second processing means, said object oriented programming language based query to said second proxy;

using said second proxy and said second processing means, encoding said object oriented programming language based query into an operating system based query at run time;

transmitting, using said second processing means, said operating system based query to said first process at run time;

decoding, using said first processing means, said operating system based query into an object oriented programming language based query at run time;

transmitting, using said first processing means, said object oriented programming language based query to said first object;

said first object generating an object oriented programming language based reply, using said first processing means;

encoding, using said first processing means, said object oriented programming language based reply into an operating system based reply at run time;

transmitting, using said first processing means, said operating system based reply to said second process at run time;

decoding, using a second processing means, said operating system based reply into an object oriented programming language based reply at run time;

transmitting, using said second processing means, said object oriented programming language based reply, using said second processing means, and generating an object oriented programming language based result;

encoding, using said second processing means, said object oriented programming language based result into an operating system based result at run time;

transmitting, using said second processing means, said operating system based result to said first process at run time;

decoding, using said first processing means, said operating system based result into an object oriented programming language based result;

transmitting, using said first processing means, said object oriented programming language based result to said first object.

12. The method of claim 11 wherein said object oriented programming language based message comprises a method and an argument.

13. The method of claim 12 wherein said second object executes said method on said argument when executing said message.

14. The method of claim 11 wherein said first process and said second process are located on first and second computers respectively.

15. The method of claim 11 wherein said object oriented programming language based message comprises an objective C message.

16. The method of claim 11 wherein said operating system based message comprises a Mach message.

17. The method of claim 11 wherein said first proxy represents said second object.

18. The method of claim 11 wherein said second proxy represents said first object.

19. A method for sending, in a C environment with minimal run time support, an object oriented programming language based message having dynamic binding from a first object in a first process to a second object in a second process, said method comprising the steps of:

transmitting, using a first processing means implementing said C environment, said object oriented programming language based message to a first proxy in said first process;

using said first proxy and said first processing means, encoding said object oriented programming language based message into an operating system based message at run time;

transmitting said operating system based message to said second process at run time;

decoding, using a second processing means implementing said C environment, said operating system based message into a language based message;

transmitting, using said second processing means, said object oriented programming language based message to said second object.

20. The method of claim 19 further including the steps of:

said second object executing said object oriented programming language based message, using said second processing means, and generating an object oriented programming language based result;

encoding, using said second processing means, said object oriented programming language based result into an operating system based result at run time;

transmitting, using said second processing means, said operating system based result to said first process at run time;

decoding said operating system based result into an object oriented programming language based result at run time, using said first processing means;

transmitting, using said first processing means, said object oriented programming language based result to said first object.

21. The method of claim 20 wherein the step of executing said object oriented programming language based message further includes the steps of:

said second object determining, using said second processing means, whether additional information is needed to execute said object oriented programming language based message;

said second object generating, using said second processing means, an object oriented programming language based query if it is determined that additional information is needed;

encoding, using said second processing means, said object oriented programming language based query into an operating system based query at run time if it is determined that additional information is needed;

transmitting said operating system based query to said first process at run time, using said second processing means if it is determined that additional information is needed;

decoding, using said first processing means, said operating system based query into an object oriented programming language based query at run time if it is determined that additional information is needed;

transmitting, using said first processing means, said object oriented programming language based query to said first object if it is determined that additional information is needed.

22. The method of claim 21 further including the steps of:

said first object generating, using said first processing means, an object oriented programming language based reply to said object oriented programming language based query;

encoding said object oriented programming language based reply into an operating system based reply at run time, using said first processing means;

transmitting, using said first processing means, said operating system based reply to said second process at run time;

decoding, using said second processing means, said operating system based reply into an object oriented programming language based reply at run time;

transmitting, using said processing means, said object oriented programming language based reply to said second object.

23. The method of claim 21 wherein said operating system based message comprises a Mach message.

24. The method of claim 21 wherein said first processing means and said second processing means are the same processing means.

* * * * *

EX PARTE REEXAMINATION CERTIFICATE (8631st)
United States Patent
Serlet et al.

(10) Number: US 5,481,721 C1
(45) Certificate Issued: Oct. 25, 2011

(54) METHOD FOR PROVIDING AUTOMATIC AND DYNAMIC TRANSLATION OF OBJECT ORIENTED PROGRAMMING LANGUAGE-BASED MESSAGE PASSING INTO OPERATION SYSTEM MESSAGE PASSING USING PROXY OBJECTS

(75) Inventors: Bertrand Serlet, Palo Alto, CA (US);
Lee Boynton, Palo Alto, CA (US);
Avadis Tevanian, Mountain View, CA (US)

(73) Assignee: Canon Inc., Shinjuku-Ku, Tokyo (JP)

Reexamination Request:
No. 90/011,292, Oct. 19, 2010

Reexamination Certificate for:
Patent No.: 5,481,721
Issued: Jan. 2, 1996
Appl. No.: 08/332,486
Filed: Oct. 31, 1994

Related U.S. Application Data

(63) Continuation of application No. 07/731,636, filed on Jul. 17, 1991, now abandoned.

(51) Int. Cl.
*G06F 9/46* (2006.01)

(52) U.S. Cl. .................................................. 719/315
(58) Field of Classification Search .................... None
See application file for complete search history.

(56) References Cited

PUBLICATIONS

The ANSA Reference Manual, Architecture Projects management limited, advanced Networked Systems Architecture (Mar. 1989), Part I, Part VI, Part VII and Part XI.*

Shapiro et al., SOS: An Object–Oriented Operating System—Assessment and Perspectives, Computing Systems, vol. 2, No. 4, pp. 287–337 (Fall 1989).
Birrell et al, Implementing Remote Procedure Calls, ACM Transactions on Computer Systems, vol. 2, No. 1, pp. 39–59 (Feb. 1984).
Gourhant et al., FOG/C++: A Fragmented–Object Generator, Proceedings of the USENIX C++ Conference, Institut National de Recherche en Informatique et en Automatique, Le Chesnay Cedex, France (Mar. 9, 1990).
Cox et al., Producer: A Tool for Translating Smalltalk–80 to Objective–C, Proceedings of the Object–Oriented Programming Systems, Languages and Applications Conference (OOPSLA), pp. 423–429 (Oct. 4–8, 1987).
Cox, Object Oriented Programming: An Evolutionary Approach, Addison–Wesley (1986).
Accetta et al., Mach: A New Kernel Foundation for UNIX Development, Proceedings for the USENIX Conference, Carnegie Mellon University (1986).
Andrew Watson, "ANSA Phase III: ANSA and OMG," Mar. 18, 1995, Available online at http://www.ansa.co.uk/ANSATech/95/MGMent/144402.pdf, last visited Apr. 5, 2011.
NeXT Publications "NeXTStep Reference," Addison–Wesley, 1991, 994 pages.

(Continued)

*Primary Examiner* — Joshua Campbell

(57) ABSTRACT

The present invention provides a method and apparatus for the distribution of objects and the sending of messages between objects that are located in different processes. Initially, a "proxy" object is created in the same process as a sender object. This proxy acts as a local receiver for all objects in the local program. When the proxy receives a message, the message is encoded and transmitted between programs as a stream of bytes. In the remote process, the message is decoded and executed as if the sender was remote. The result follows the same path, encoded, transmitted, and then decoded back in the local process. The result is then provided to the sending object.

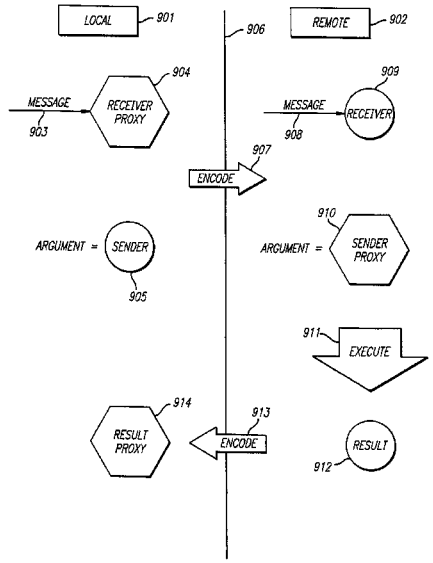

OTHER PUBLICATIONS

"NeXT and Open Systems Standards," NeXT Computer, Inc., Redwood City, CA, 1991, Available online at http://www.kevra.org/TheBestOfNext/page570/page571/page616/files/page616_1.pdf, last visited Apr. 5, 2011.

Video 8, Boynton et al. "NeXTSTEP Workspace Manager, System Release 3.0."

Guy T. Almes, et al., "The Eden System: A Technical Review", IEEE transactions on Software Engineering, vol. SE–11, No. 1, Jan. 1985, pp. 43–59.

David B. Anderson, et al., "Experience with Flamingo:A Distributed, Object–Oriented User Interface System", OOPSLA '86 Proceedings, Sep. 1986, pp. 177–185.

Alex Duong Nghiem, "NeXTSTEP programming: concepts and applications," Prentice–Hall, Inc., Upper Saddle River, NJ, 1993, 640 pages.

Michael B. Shebanek, "The Complete Guide to the Nextstep User Environment," Springer Verlag, Aug. 1, 1993, New York, NY, Telos the Electronic Library of Science, Santa Clara, CA, 473 pages.

John K. Bennett, "Distributed Smalltalk: Inheritance and Reactiveness in Distributed Systems", Doctoral Dissertation, University of Washington, 1988.

Bruce F. Webster, "The NeXT Book," Addison–Wesley, Reading, MA, 1989, 409 pages.

A. Black, et al., "Distribution and Abstract Types in Emerald", IEE Transactions on Software Engineering, vol. SE–13, No. 1, Jan. 1987, pp. 65–76.

Andrew Black, et al., "Object Structure in the Emerald System", OOPSLA '86 Proceedings, Sep. 1986, pp. 78–86.

NeXT Publications "NeXTStep: Operating System Software," Addison–Wesley, Sep. 1992, 451 pages.

D. Decouchant, "Design of a Distributed Object Manager for the Smalltalk–80 System" OOPSLA '86 Proceedings, Sep. 1986, pp. 444–452.

Jean Pierre Deschrevel,et al., "A Brief Overview of the ANSA Trading Service", ANSA APM/RC 324.00, Feb. 18, 1992.

Margaret A. Ellis, et al., "The Annotated C++ Reference Manual", Addison–Wesley, May 1991.

Adele Goldberg, et al., "Smalltalk–80—The Language and its Implementation", Addison–Wesley Publishing Co., 1983.

Adele Goldberg, "Smalltalk–80—The Interactive Programming Environment", Addison–Wesley Publishing Co., 1984.

NeXT Publications "NeXTStep General Reference vol. 2: Release 3," Addison–Wesley, Nov. 1992, 1356 pages.

Andrew Herbert, "Object Management in the ISO/CCITT Basic Reference Model for Open Distributed Processing", ANSA APM/RC 456.00.doc, Mar. 4, 1993.

Andrew Herbert, et al., "ORB Interoperability", ANSA OMG 93–5–9, May 14, 1993.

Hotline on Object–Oriented Technology, vol. 2, No. 8, Jun. 1991.

Michael B. Jones, et al., "Mach and Matchmaker: Kernel and Language Support for Object–Oriented Distributed Systems", OOPSLA '86 Proceedingss, Sep. 1986, pp. 67–77.

Eric Jul, et al., "Fine–Grained Mobility in the Emerald System", ACM Transactions on Computer Systems, vol. 6, No. 1, Feb. 1988, pp. 109–133.

Edward D. Lazowska, et al., "The Architecture of the Eden System", ACM 81–0148, 1981, pp. 148–159.

Pradeep P. Mansey, "Distributed C++: Design and Implementation", Masters Thesis, Rochester Institute of Technology School of Computer Science and Technology, Oct. 9, 1989.

Paul M. McCullough, "Transparent Forwarding: First Steps", OOPSLA '87 Proceedings, Oct. 4–8, 1987, pp. 331–341.

Sape J. Mullender, et al., "Amoeba—A Distributed Operating System for the 1990s", IEEE Computer, May 1990, pp. 44–53.

Bruce Jay Nelson, "Remote Procedure Call", Doctoral Dissertation, Carnegie–Mellon University Report No. CSL–81–9, May 1981.

Leigh Power, et al., ed., OOPSLA '87 Addendum to the Proceedings, Oct. 4–8, 1987.

Rajendra K. Raj, "Emerald: A General Purpose Programming Language", Software—Practice and Experience, vol. 21(I), Jan. 1991, pp. 91–118.

Marc Shapiro, "Structure and Encapsulation in Distributed Systems: The Proxy Principle", The 6th Int'l Conf. on Distributed Computing Systems, May 19–23, 1986, pp. 198–204.

NeXT Publications "NeXTStep: General Reference vol. 1: Release 3," Addison–Wesley, Nov. 1992, 1230 pages.

Richard Mark Soley, Letter re: OMG TC Document 92.4.2, Apr. 7, 1992.

Guido Van Rossum, "AIL—A Class–Oriented RPC Stub Generator for Amoeba", pp. 85–93.

Helen Casbona, K. Vian, R. West, "User's Guide," NextStep, Jan. 1, 1993, 404 pages.

Doug Clapp, "The Next Bible: Hardware and Software Systems for the Next Computer," Brady Books, NY, 1990, 685 pages.

Simson L. Garfinkel, M.K. Mahoney, "NeXTSTEP Programming, step one: object–oriented applications," Springer Verlag, New York, NY, 663 pages.

NeXT Computer Inc., "NeXT Technical Summaries," NeXT Computer Inc., Redwood City, CA, Dec. 1990, 365 pages.

NeXT Computer Inc., "NXBundle," NeXT Computer Inc., 1995, 10 pages.

NeXT Computer Inc., "OpenStep Specification," NeXT Computer Inc., Oct. 19, 1994, 518 pages.

Gary Miller, J. Inscore, "NeXT Development Tools," NeXT Computer Inc., Redwood City, CA, 1990, 254 pages.

NeXT Computer Inc., "NeXTSTEP programming interface summary, release 3," Addison–Wesley, 1992, 467 pages.

NeXT Computer Inc., "NeXTstep 3.3: Developer Documentation Manuals," NeXT Software Inc., 1994.

Stan Augarten, H. Casabona, C. Rose, H. Ross, L. Koponen, "The NeXT User's Reference Manual," NeXT Inc., Redwood City, CA, 1989, 457 pages.

NeXT Publications, "NeXTStep User Interface Guidelines: Release 3," Addison–Wesley, Apr. 1993, 198 pages.

Gary Miller, K. Walrath, "NeXT Operating System Software," NeXT Computer Inc., Redwood City, CA, 1990, 244 pages.

NeXT Publications, "Development Tools and Techniques: Release 3," Addison–Wesley, Nov. 1993, 453 pages.

NeXT Publications, "NeXTStep: Object–Oriented Programming and the Objective C Language: Release 3," Addison–Wesley, Nov. 1993, 254 pages.

NeXT Publications, "NeXTStep: Programming Interface Summary," Addison–Wesley, Apr. 1993, 466 pages.

NeXT Computer Inc., "3.3 Release Notes: C Compiler," NeXT Computer Inc., 1995, 149 pages.

Marc Shapiro et al., "SOS: An Object–Oriented Operating System Assessment and Perspectives," Jun. 5, 1991, article appeared in Computing Systems, vol. 2, No. 4, pp. 287–337, Fall 1989.

NeXTSTEP Operating System v. 1.0, Released Sep. 18, 1989.

Profile of Andrew Watson, Vice President and Technical Director at OMG, Available online at http://homepage.ntlworld.com/ajwatson/, last visited Apr. 5, 2011.

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-24 is confirmed.

* * * * *